United States Patent
Bhat et al.

(10) Patent No.: US 12,381,646 B1
(45) Date of Patent: Aug. 5, 2025

(54) MITIGATING SHADOW FADING AND INTERFERENCE

(71) Applicant: Amazon Technologies, Inc., Seattle, WA (US)

(72) Inventors: Uttam Bhat, Fremont, CA (US); Basak Oyman, Mountain View, CA (US); Franklin Mathew Zhang, Irvine, CA (US); Louie Serrano, Chino Hills, CA (US)

(73) Assignee: Amazon Technologies, Inc., Seattle, WA (US)

( * ) Notice: Subject to any disclaimer, the term of this patent is extended or adjusted under 35 U.S.C. 154(b) by 395 days.

(21) Appl. No.: 17/949,885

(22) Filed: Sep. 21, 2022

(51) Int. Cl.
  *H04J 11/00* (2006.01)
  *H04L 5/00* (2006.01)

(52) U.S. Cl.
  CPC ........ *H04J 11/0036* (2013.01); *H04L 5/0007* (2013.01)

(58) Field of Classification Search
  CPC .. H04W 24/08; H04L 1/0003; H04L 43/0847; H04L 1/0009; H04L 1/0019; H04L 1/0025; H04L 1/0026; H04L 1/203; H04L 1/0015; H04L 5/0007; H04J 11/0036
  See application file for complete search history.

(56) References Cited

U.S. PATENT DOCUMENTS

| | | | |
|---|---|---|---|
| 8,493,874 B2 * | 7/2013 | Chen | H04L 1/0027 370/254 |
| 2022/0182193 A1 * | 6/2022 | Im | H04L 5/0055 |
| 2022/0400042 A1 * | 12/2022 | Horn | H04L 27/2614 |
| 2023/0006868 A1 * | 1/2023 | Babich | H04L 1/24 |
| 2023/0164003 A1 * | 5/2023 | Tsui | H04L 41/16 455/522 |
| 2023/0308235 A1 * | 9/2023 | Rodriguez | H04L 5/0007 |

\* cited by examiner

*Primary Examiner* — Brian T O Connor
(74) *Attorney, Agent, or Firm* — Lowenstein Sandler LLP

(57) ABSTRACT

Technologies directed to rate adaption based on both the average signal-to-noise ratio (SNR) and standard deviation are described. One method includes determining an average SNR value and a standard deviation value for a first set of RSSI samples. The method determines whether the average SNR value satisfies a first threshold criterion corresponding to a minimum SNR required with a first modulation scheme and a second threshold criterion corresponding to a standard deviation threshold. The method causes a transmitter to use the first modulation scheme for a subsequent packet, responsive to the average SNR value satisfying the first threshold criterion or the standard deviation value satisfying the second threshold criterion. The method causes the transmitter to use the second modulation scheme for the subsequent packet, responsive to the average SNR value not satisfying the first threshold criterion and the standard deviation value not satisfying the second threshold criterion.

22 Claims, 19 Drawing Sheets

MITIGATING SHADOW FADING AND INTERFERENCE

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. To wirelessly communicate with other devices, these devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
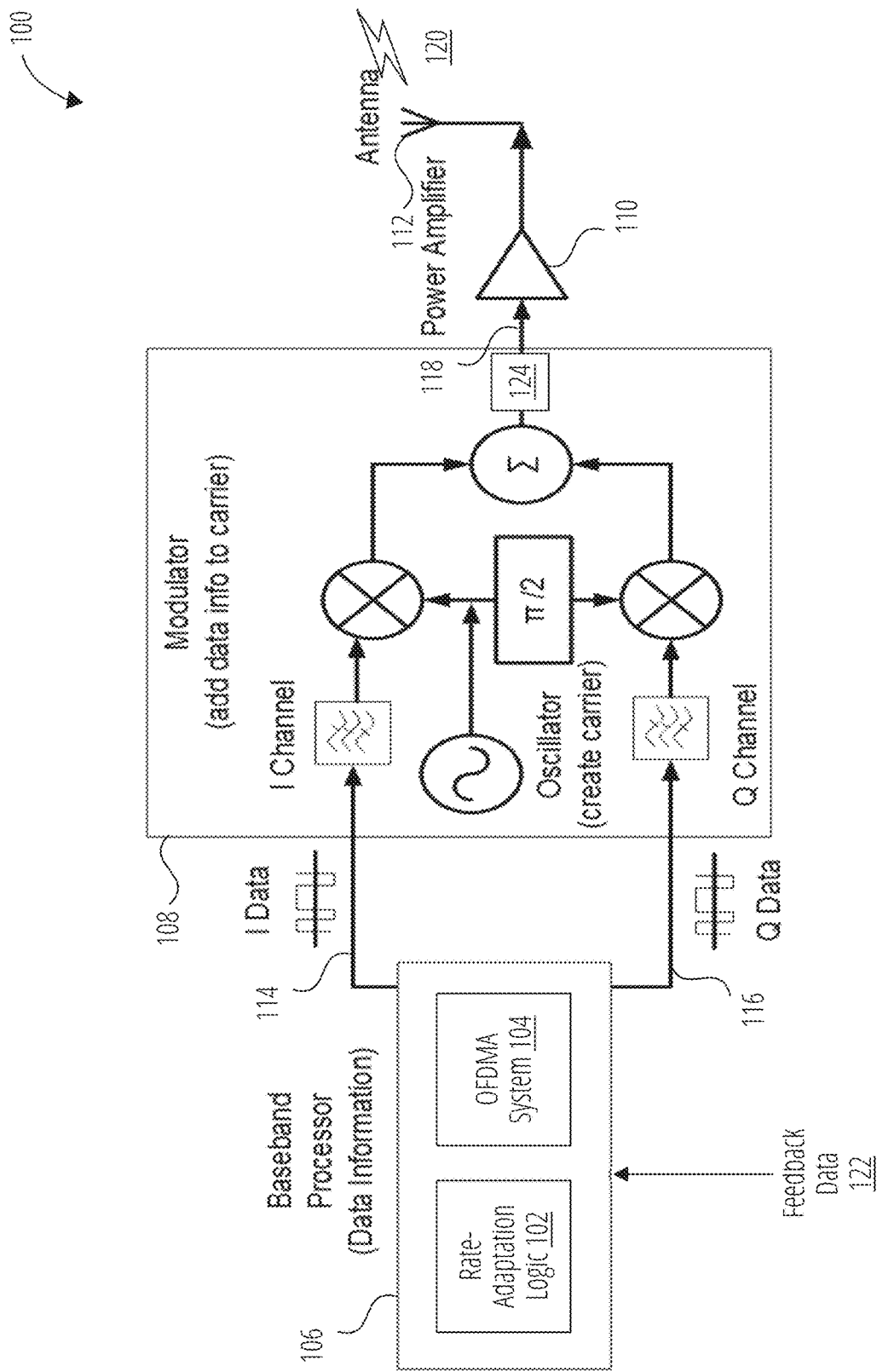
FIG. 1 is a block diagram of an electronic device with rate-adaptation logic and an Orthogonal Frequency-Division Multiple Access (OFDMA) system to mitigate shadow fading and interference characteristics of a wireless channel according to one embodiment.

Technologies directed to rate adaption based on both the average signal-to-noise ratio (SNR) and standard deviation are described. Rate adaption in traditional wireless communication systems uses Channel State Information (CSI) data, such as average SNR, which is directly related to the average Receive Signal Strength Indicator (RSSI) and signal bandwidth, to adapt the bitrate that best suits the channel condition. This works well in slow-varying channel conditions since the CSI does not change significantly across multiple packets. However, the selected rate is sub-optimal most of the time if the channel is changing rapidly.

More specifically, in a traditional wireless communication system, the data rate is reduced to combat channel fading impact. In other words, when channel quality worsens, the system switches to more robust modulation schemes with lower data rate (LDR) modulation schemes rather than higher data rate (HDR) modulation schemes. The LDR and HDR can have different modulation and coding scheme (MCS) rates and/or physical layer (PHY) rates. As described above, such an approach becomes less useful in an environment where the channel can change rapidly from packet to packet or within a packet. In such scenarios, packet repetitions with shorter packets with HDR modulation schemes can be more beneficial than longer LDR packets with fewer or no repetitions. The rate adaptation in a traditional wireless communication system is focused on maximizing system throughput. To achieve it, the CSI data, as observed by a receiver (RX), is fed back to a transmitter (TX) such that the TX can adapt the bitrate to best suit the current channel condition. Traditional schemes use CSI, such as average SNR, which is directly related to the average RSSI and signal bandwidth. As described above, such a system works well in slow-varying channel conditions when the CSI does not change significantly across multiple packets. In other words, the CSI is still applicable at the time when a new rate/modulation is selected. This may not be feasible if the channel is changing rapidly, deeming the selected rate sub-optimal most of the time.

Aspects and embodiments of the present disclosure address the above and other deficiencies by providing a system that considers channel statistics observed over a time frame of multiple packets and adapts the rate based on an average SNR (mean value) and a standard deviation of the samples. Aspects and embodiments of the present disclosure address fading channels with rate adaptation based on how fast the channel changes. When the channel variations are large, it is more advantageous to switch to higher bitrates (an HDR modulation scheme) with shorter packet durations and use packet repetitions instead of switching to lower bitrates (an LDR modulation scheme) with longer packet durations. Both options will result in a similar throughput, but the shorter packets (with higher bitrate) will have more chances to go through different channel conditions to take advantage of time diversity (TD). This also helps in mitigating the effects of sporadic interference.

Although various embodiments are described below in the context of wireless local area network (WLAN) technologies, such as the Wi-Fi® technology, the embodiments described herein can be used in other wireless technologies, such as personal area network (PAN) technologies (e.g., Bluetooth® and Zigbee® technologies), wireless area network (WAN) technologies, such as cellular technologies including Long Term Evolution (LTE) frequency bands, fourth-generation (4G) frequency bands, or the like. Similarly, although various embodiments are described below in the context of OFDM, the embodiments described herein can be used in connection with other modulation schemes or multi-carrier modulation schemes, such as frequency-shift keying (FSK), Gaussian FSK (GFSK), or the like.

FIG. 1 is a block diagram of an electronic device 100 with rate-adaptation logic 102 and OFDMA system 104 to mitigate shadow fading and interference characteristics of a wireless channel according to one embodiment. The electronic device 100 includes a baseband processor 106, including the OFDMA system 104 and the rate-adaptation logic 102. The electronic device 100 also includes a modulator 108, a power amplifier 110, and an antenna 112. In other embodiments, the rate-adaptation logic 102 can be used in connection with an OFDM system, or other types of modulation systems. For example, the rate-adaptation logic 102 can be used in connection with FSK, GFSK, or the like.

The OFDMA system 104 includes a digital signal processing logic (e.g., hardware, software, or any combination thereof) that implements a digital multi-carrier modulation scheme-OFDMA scheme. The OFDMA scheme extends a single subcarrier modulation concept by using multiple subcarriers within the same single channel. Rather than transmitting a high-rate stream of data with a single subcarrier, OFDMA uses a number of closely spaced orthogonal subcarriers transmitted in parallel. Each subcarrier is modulated with a digital modulation scheme, such as Quadrature Phase Shift Keying (QPSK), 16-level Quadrature Amplitude Modulation (16QAM), etc.) at a low symbol rate. The combination of many subcarriers enables similar data rates as single-carrier modulation schemes with similar bandwidths. In the OFDMA system 104, different information streams are mapped onto separate parallel frequency channels. Each channel is separated from the others by a frequency guard band to reduce interference between adjacent channels. So, in OFDMA system 104, multiple subcarriers carry the information stream, and the data subcarriers are orthogonal to each other. The guard interval is added to each symbol to minimize the channel delay spread and intersymbol interference. In the digital domain, the OFDMA system 104 can map digitally modulated input data, referred to as data symbols, onto orthogonal subcarriers. The data symbols are frequency-domain input data, such as complex numbers representing the modulated subcarriers. The OFDMA system 104 converts the data symbols to the time-domain output data representing the analog OFDMA symbol waveforms. In the illustrated embodiment, the OFDMA system 104 outputs the OFDMA symbol waveforms as I data 114 and Q data 116 to the modulator 108. In general, the modulator 108 receives the output data from the OFDMA system 104 and modulates the output data to add the output data to a carrier signal to obtain an intermediate frequency (IF) signal. The IF signal is output by the modulator 108 to an IF block 124 (e.g., up-converter) that up-converts the data-IF signal to a data-carrying signal 118. The IF block 124 outputs the data-carrying signal 118 to the power amplifier 110, which amplifies the data-carrying signal 118 to broadcast the data-carrying signal 118 as a radio frequency (RF) signal 120 via the antenna 112.

In at least one embodiment, the OFDMA system 104 includes the rate-adaptation logic 102. The rate-adaptation logic 102 receives feedback data 122 from a second device with which the electronic device 100 is communicating. The feedback data 122 can include received signal power levels at one or more receivers of the second device on a subcarrier basis. The feedback data 122 can include CSI data, RSSI data (e.g., RSSI samples/values), or the like. The feedback data 122 can include the spectral profile differences between multiple receivers on a subcarrier basis. Using the feedback data 122, the rate-adaptation logic 102 selects between different data rate modulation and coding schemes. In some embodiments described herein, the different modulation scheme can change the data rates. In other embodiments, other aspects of the modulation and coding schemes can be adjusted. For example, the rate-adaptation logic 102 can modify a type of modulation being used, a coding rate used by the same modulation scheme or different modulation schemes, or any combination thereof. In another embodiment, the first modulation scheme can have a first spreading factor and the second modulation scheme can have a second spreading factor that is different from the first spreading factor. In another embodiment, the first modulation scheme can be a chirp spread spectrum modulation scheme with a first chirp rate and the second modulation scheme be a chirp spread spectrum modulation scheme with a second chirp rate that is different from the first chirp rate. In another embodiment, the first modulation scheme can be a chirp spread spectrum modulation scheme and the second modulation scheme be another type of modulation scheme, such as a FSK modulation scheme, a GFSK modulation scheme, an OFDM scheme, a OFDMA scheme, or the like. It should also be noted that various embodiments describe changing from a higher to lower data rate, however, in other embodiments, the rate-adaptation logic 102 can adjust from lower to higher as well.

In at least one embodiment, the rate-adaptation logic 102 obtains a first set of RSSI samples associated with one or more packets transmitted by a transmitter of the electronic device 100 to a receiver of a second device over a wireless channel. The rate-adaptation logic 102 determines a current average SNR value associated with the first set of RSSI samples and a current standard deviation value associated with the first set of RSSI samples. The rate-adaptation logic 102 determines whether the current average SNR value satisfies a first threshold criterion corresponding to a minimum SNR required with a first modulation scheme at the current standard deviation value to meet a target Packet Error Rate (PER). The first modulation scheme has a first data rate. The rate-adaptation logic 102 determines whether the current standard deviation value satisfies a second threshold criterion corresponding to a standard deviation threshold between the first modulation scheme and a second modulation scheme having a second data rate less than the first data rate. The rate-adaptation logic 102 causes the transmitter to use the first modulation scheme for a subsequent packet or a subsequent portion of the one or more packets, responsive to the current average SNR value satisfying the first threshold criterion or the current standard deviation value satisfying the second threshold criterion. The rate-adaptation logic 102 causes the transmitter to use the second modulation scheme for the subsequent packet or the subsequent portion of the one or more packets, responsive to the current average SNR value not satisfying the first threshold criterion and the current standard deviation value not satisfying the second threshold criterion. In another embodiment, the first modulation scheme has a first coding rate and the second modulation scheme has a second coding rate different from the first coding rate. In another embodiment, the first modulation scheme has a first spreading factor and the second modulation scheme has a second spreading factor that is different from the first spreading factor. Additional details of the rate-adaptation logic 102 are described below with respect to FIG. 4A to FIG. 15.

In at least one embodiment, the second device provides feedback data 122 to the rate-adaptation logic 102 whenever there is a change in the wireless channel conditions. For example, if the wireless channel conditions meet a specified criterion, such as exceeding a predefined threshold, the second device can send the feedback data 122 to the rate-adaptation logic 102 to select one of the data rate modulation schemes.

In at least one embodiment, the baseband processor 106 performs bit-level processing on input bits to generate quadrature amplitude modulation (QAM) symbols or phase-shift keying modulation (PSK) symbols. The symbols can be discrete time-domain data in the I data 114 and Q data 116. To perform the symbol-level processing, the baseband processor 106 can perform an inverse Fast Fourier Transform (IFFT) of the symbols.

In one embodiment, the rate-adaptation logic 102 can provide control information (e.g., control signals, instructions, commands, or the like) to other blocks of the OFDMA system 104 to modify the parameters of one or more of the OFDMA system 104. For example, an OFDMA parameter structure can specify an amplitude value for each of the data subcarriers. Alternatively, the OFDMA system 104 can include one or more registers identifying which subcarriers should be increased, decreased, or otherwise adjusted. The parameter information of the OFDMA parameter structure can also include total bandwidth (BW), operating bandwidth (OBW), subcarrier spacing, information rate, modulation, coding rate, total subcarriers, data subcarriers, pilot subcarriers, and direct current (DC) subcarrier. The OFDMA parameter structure's parameter information can be modified by the rate-adaptation logic 102 to modify the operation of the OFDMA system 104 to control amplitude values for a subset of the data subcarriers.

The electronic device 100 can also include additional components, such as one or more processors (e.g., a host processor or central processing unit (CPU), one or more graphics processors, input-output (I/O) devices, memory devices, storage devices, or the like. The baseband processor 106 can include additional components, such as a processing device that can execute operations to implement the processing logic of the rate-adaptation logic 102. A memory storing instructions that, when executed by the processing device, configure the electronic device 100 to perform the operations described herein. Alternatively, the rate-adaptation logic 102 can be implemented as hardware, such as a hardware state machine that receives one or more inputs, changes to one or more states based on the inputs, and outputs one or more control signals based on the current state. In some cases, the functionality of the rate-adaptation logic 102 can be integrated into or in connection with the OFDMA system 104. The baseband processor 106 can include one or more interfaces, such as a serial interface (e.g., I2C interface) that can be used by the rate-adaptation logic 102 to generate one or more control signals to control the OFDMA system 104, the power amplifier 110, or any combination thereof. The baseband processor 106 can include one or more interfaces with a host processor to communicate status, data, whether a transmitter is active, which transmitter is active, MCS information, or the like. In another embodiment, the baseband processor 106 includes an interface to receive the feedback data 122 or other data indicative of received signal strength at one or more receivers of the second device, as described herein.

In other embodiments, the electronic device 100 is an access point (AP), which provides access to the Internet, a private network, or other public networks. In another embodiment, the electronic device 100 is a base station (BS), which connects to one or more relay stations (RL), one or more gateways (GWs), one or more customer premises equipment (CPE) devices, or the like. The electronic device 100 may be any content rendering device that includes a modem for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, Blu-ray® or DVD players, media centers, drones, audio-input-enabled devices, speech-based personal data assistants, tracking tags, IoT devices, and the like. The electronic device 100 may also be an audio-input-enabled device, such as the Amazon Echo device, developed by Amazon Technologies, Inc. of Seattle, WA. Alternatively, the electronic device 100 may be a set-top box (STB) or other media streaming device. The electronic device 100 may connect to a network to obtain content from a server computing system (e.g., an item-providing system) or perform other activities. The electronic device 100 may connect to one or more different types of cellular networks. In some embodiments, the electronic device 100 connects to an access point (AP), which provides access to the Internet, a private network, or other public networks.

The electronic device 100 includes a circuit board, such as a printed circuit board (PCB), upon which one or more of the components described above is disposed. The components can be integrated into one or more integrated circuits. In some embodiments, the baseband processor 106 and the modulator 108 are separate integrated circuits or chipsets. In one embodiment, the baseband processor 106 and the modulator 108 reside on a common carrier substrate die of an integrated circuit. In other embodiments, the baseband processor 106 and the modulator 108 are disposed on the PCB along with RF front-end circuitry, such as the power amplifier 110, the modulator 108, or the like. The baseband processor 106 is operable to generate RF signals to radiate electromagnetic energy via one or more antennas, such as the antenna 112.

In some cases, the baseband processor 106, modulator 108, the power amplifier 110, or any combination thereof can be implemented in an RF module, such as a chipset implementing the Wi-Fi® technology. In one embodiment, the RF circuitry includes a WLAN radio and a PAN radio.

In other embodiments, the RF radios may be specific to the frequency bands of interest. A processing device coupled to the baseband processor 106 may be an application processor that implements other operations of the electronic device 100. In another embodiment, an application-specific integrated circuit (ASIC), a field-programmable gate array (FPGA), or other mixed-signal integrated circuits may be used to implement the operations described herein to control amplitudes of select subcarriers of the OFDMA system 104 when connected to another device on a wireless channel.

In one embodiment, the baseband processor 106 includes one or more transceivers that can operate at 800-900 MHz (or other sub-GHz frequencies), 2.45 Gigahertz (GHz), 5 GHz, and/or the like. The baseband processor 106 can implement the LoRa® technology. The baseband processor 106 can implement the Wi-Fi® technology. It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connect to the Internet using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. The WLAN radio may include additional transceivers that operate in the 2.45 GHZ, 5 GHZ, or both. A PAN module includes a transceiver that also operates at 2.4 GHz and may implement the Bluetooth® technology or the Zigbee® technology. A LR module can include a transceiver that operates at 800-900 MHz and may implement the LoRa® technology. The WLAN radio and PAN radio can be individual chipsets, even chipsets provided by different vendors. The WLAN radio and the PAN radio may be implemented in the same chipset or on a common carrier substrate with a processing device, such as a System on Chip (SoC) architecture. In another embodiment, other wireless RF radios may be used to implement other technologies, such as the LTE technology, or the like. For example, the RF circuitry may include other radios, such as a wireless area network (WAN) radio, PAN radio, Global Navigation satellite system (GNSS) radio (e.g., global positioning system (GPS) radio), or the like. In other embodiments, the antenna architecture may include additional RF radios and/or other communication modules, such as a WLAN radio, a GPS receiver, a near field communication (NFC) radio, an amplitude modulation (AM) radio receiver, a frequency modulation (FM) radio receiver, a PAN radio (e.g., Bluetooth® radio, Zigbee® radio), a GNSS receiver, or the like. The RF circuitry may also include receivers and/or transmitters, filters, amplifiers, mixers, switches, and/or other electrical components. The RF circuitry may be coupled to a modem that allows the user device to handle both voice and non-voice communications (such as communications for text messages, multi-media messages, media downloads, web browsing, etc.) with a wireless communication system. The modem may provide network connectivity using any type of digital mobile network technology, including, for example, LTE, LTE advanced (4G), CDPD, GPRS, EDGE, UMTS, Rett, EVDO, HSDPA, WLAN (e.g., Wi-Fi® network), etc. In the depicted embodiment, the modem can use the RF circuitry to radiate electromagnetic energy on the antennas to communicate data to and from the user device in the respective frequency ranges. In other embodiments, the modem may communicate according to different communication types (e.g., WCDMA, GSM, LTE, CDMA, WiMAX, etc.) in different cellular networks. It should be noted that radiation enables the functionality of both transmission and receiving data using reciprocity.

In one embodiment, the OFDMA system 104 is implemented as hardware, software, firmware, or any combination thereof in a digital domain, an analog domain, or both. In other embodiments, the OFDMA system 104 includes an OFDMA block in a digital domain and an analog front-end in the RF domain.

Figure 2:
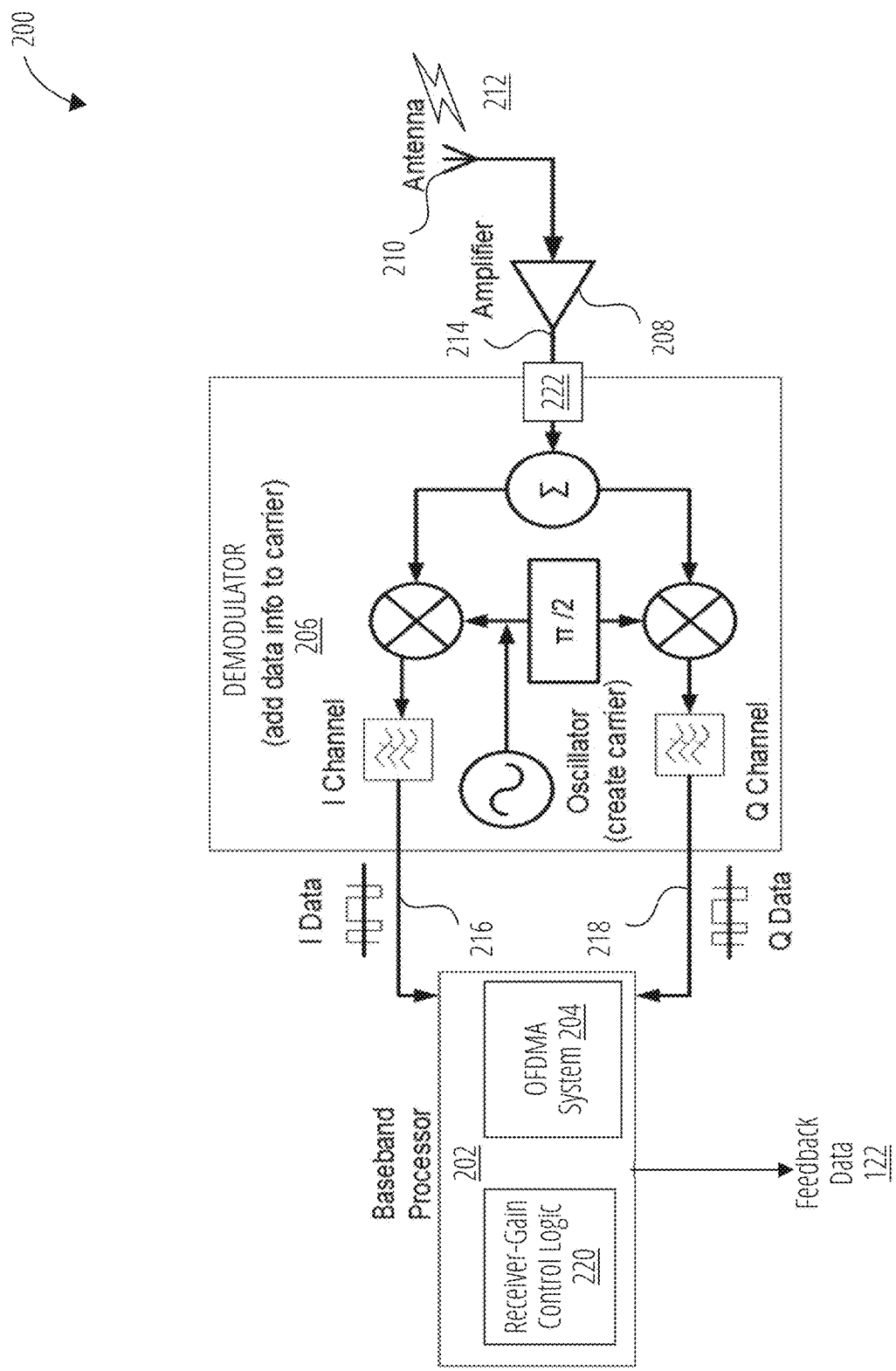
FIG. 2 is a block diagram of an electronic device with receiver-gain control logic in a receiver to reduce the impact of fast fading at a receiver, according to one embodiment.

FIG. 2 is a block diagram of an electronic device 200 with receiver-gain control logic 220 in a receiver to reduce the impact of fast fading at a receiver according to one embodiment. The electronic device 200 includes a baseband processor 202, including the receiver-gain control logic 220. The electronic device 200 also includes a demodulator 206, an amplifier 208, and an antenna 210. In general, the amplifier 208 receives an RF signal 212 via the antenna 210 and outputs an amplified signal 214 to an IF block 222 (e.g., down-converter) of the demodulator 206. The demodulator 206 receives the amplified signal 214, down-converts the amplified signal 214 to obtain an IF signal, and demodulates the IF signal with a carrier signal to obtain input data in the form of I data 216 and Q data 218. The I data 216 and Q data 218 are input to the baseband processor 202 for further processing by the OFDMA system 204 and the receiver-gain control logic 220. The demodulator 206 can include analog-to-digital converters (ADCs) to convert analog signals into digital signals. The OFDMA system 204 includes a digital signal processing logic (e.g., hardware, software, or any combination thereof) that implements a digital multi-carrier modulation scheme (e.g., OFDMA scheme). The OFDMA system 204 and the demodulator 206 operate similarly as described above but in the other direction. The baseband processor 202 can generate and provide feedback data 122 to a transmitter, as described in FIG. 1. In at least one embodiment, the electronic device 200 provides feedback data 122 to the rate-adaptation logic 102 whenever there is a change in the wireless channel conditions. For example, if the wireless channel conditions meet a specified criterion, such as exceeding a predefined threshold, the electronic device 200 can send the feedback data 122 to the rate-adaptation logic 102 to select one of the data rate modulation schemes described above.

The baseband processor 202 includes the receiver-gain control logic 220. The receiver-gain control logic 220 can set a receiver gain receiver to a maximum value. The receiver-gain control logic 220 can determine whether the current average SNR value is greater than a sensitivity threshold value plus a value determined based on the current standard deviation value (e.g., $x*\sigma$, where x is any number equal to or less than 3), such as three times the current standard deviation value (e.g., for a worst case scenario). The receiver-gain control logic 220 can back off the receiver gain until a peak detector no longer detects a signal saturation responsive to the current average SNR value being greater than a sensitivity threshold value plus three times the current standard deviation value. Additional details of the receiver-gain control logic 220 are described below with respect to FIG. 9 to FIG. 11.

In another embodiment, the baseband processor 202 can also include the rate-adaptation logic 102, as described above. That is, the operations of the rate-adaptation logic 102 can be performed at the receiver and sent to the transmitter. In at least one embodiment, the rate-adaptation logic 102 can provide control information (e.g., control signals, instructions, commands, or the like) to the OFDMA system 104 of the electronic device 100 (transmitter) to modify the parameters of the OFDMA system 104. The OFDMA parameter structure's parameter information can be modified by the rate-adaptation logic 102 to modify the OFDMA system 104 to control amplitude values for a subset of the data subcarriers. The rate-adaptation logic 102 on the receiver can send a first indication to cause the transmitter to use the first modulation scheme for a subsequent packet or a subsequent portion of the one or more packets, responsive to the current average SNR value satisfying the first threshold criterion or the current standard deviation value satisfying the second threshold criterion. The rate-adaptation logic 102 on the receiver can send a second indication to the transmitter to use the second modulation scheme for the subsequent packet or the subsequent portion of the one or more packets, responsive to the current average SNR value not satisfying the first threshold criterion and the current standard deviation value not satisfying the second threshold criterion.

The electronic device 200 can also include additional components, such as one or more processors (e.g., a host processor or central processing unit (CPU), one or more graphics processors, input-output (I/O) devices, memory devices, storage devices, or the like. The baseband processor 202 can include additional components, such as a processing device that can execute operations to implement the processing logic of the receiver-gain control logic 220 and/or the rate-adaptation logic 102. Alternatively, the receiver-gain control logic 220 and/or the rate-adaptation logic 102 can be implemented as hardware, such as a hardware state machine that receives one or more inputs, changes to one or more states based on the inputs, and outputs one or more control signals based on the current state. In some cases, the functionality of the receiver-gain control logic 220 and/or the rate-adaptation logic 102 can be integrated into or in connection with the OFDMA system 204. The baseband processor 202 can include one or more interfaces, such as a serial interface (e.g., I2C interface) that can be used by the receiver-gain control logic 220 and/or the rate-adaptation logic 102 to generate one or more control signals to control the OFDMA system 204 (or OFDMA system 104 of electronic device 100), the amplifier 208, or any combination thereof. The baseband processor 202 can include one or more interfaces with a host processor to communicate status, data, whether a transmitter is active, which transmitter is active, MCS information, or the like. In another embodiment, the baseband processor 202 includes an interface or mechanism to send the feedback data 122 or other data indicative of received signal strength at one or more receivers of the electronic device 200 to the electronic device 100, as described herein.

In other embodiments, the electronic device 200 is an access point (AP), which provides access to the Internet, a private network, or other public networks. In another embodiment, the electronic device 100 is a BS, which connects to one or more RLs, one or more GWs, one or more CPE devices, or the like. The electronic device 20000 may be any content rendering device that includes a modem for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, Blu-ray® or DVD players, media centers, drones, audio-input-enabled devices, speech-based personal data assistants, tracking tags, IoT devices, and the like. The electronic device 200 may also be an audio-input-enabled device, such as the Amazon Echo device, developed by Amazon Technologies, Inc. of Seattle, WA. Alternatively, the electronic device 200 may be an STB or other media streaming device. The electronic device 200 may connect to a network to obtain content from a server computing system (e.g., an item-providing system) or perform other activities. The electronic device 200 may connect to one or more different types of cellular networks. In some embodiments, the electronic device 200 connects to an AP, which provides access to the Internet, a private network, or other public networks.

The electronic device 200 includes a circuit board, such as a printed circuit board (PCB) upon which one or more of the components described above is disposed. The components can be integrated into one or more integrated circuits. In some embodiments, the baseband processor 202 and the demodulator 206 are separate integrated circuits or chipsets. In one embodiment, the baseband processor 202 and the demodulator 206 reside on a common carrier substrate die of an integrated circuit. In other embodiments, the baseband processor 202 and the demodulator 206 are disposed on the PCB along with RF front-end circuitry, such as the amplifier 208, the demodulator 206, or the like. The baseband processor 202 is operable to generate RF signals to radiate electromagnetic energy via one or more antennas, such as the antenna 210.

In some cases, the baseband processor 202, demodulator 206, amplifier 208, or any combination thereof can be implemented in an RF module, such as a chipset implementing the Wi-Fi® technology. In one embodiment, the RF circuitry includes a WLAN radio and a PAN radio. In other embodiments, the RF radios may be specific to the frequency bands of interest. A processing device coupled to the baseband processor 202 may be an application processor that implements other operations of the electronic device 200. In another embodiment, an ASIC, an FPGA, or other mixed-signal integrated circuits may be used to implement the operations described herein to control amplitudes of select subcarriers of the OFDMA system 204 when connected to another device on a wireless channel.

In one embodiment, the baseband processor 202 includes one or more transceivers that can operate at 800-900 MHZ, 2.45 GHZ, and/or 5 GHz. The baseband processor 202 can implement the Wi-Fi® technology. It should be noted that the Wi-Fi® technology is the industry name for wireless local area network communication technology related to the IEEE 902.11 family of wireless networking standards by Wi-Fi Alliance. For example, a dual-band WLAN RF transceiver allows an electronic device to exchange data or connect to the Internet using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. The WLAN radio may include additional transceivers that operate in the 2.45 GHZ, 5 GHZ, or both. A PAN module includes a transceiver that operates at 2.4 GHz and may implement the Bluetooth® technology or Zigbee® technology. The WLAN radio and PAN radio can be individual chipsets, even chipsets provided by different vendors. The WLAN radio and the PAN radio may be implemented in the same chipset or on a common carrier substrate with a processing device, such as an SoC architecture. In another embodiment, other wireless RF radios may be used to implement other technologies, such as the LTE technology, or the like. For example, the RF circuitry may include other radios, such as a wireless area network (WAN) radio, PAN radio, GNSS radio (e.g., GPS radio), or the like. In other embodiments, the antenna architecture may include additional RF radios and/or other communication modules, such as a WLAN radio, a GPS receiver, an NFC radio, an AM radio receiver, an FM radio receiver, a PAN radio (e.g., Bluetooth® radio, Zigbee® radio), a GNSS receiver, or the like. The RF circuitry may include receivers and/or transmitters, filters, amplifiers, mixers, switches, and/or other electrical components. The RF circuitry may be coupled to a modem that allows the user device to handle both voice and non-voice communications (such as communications for text messages, multi-media messages, media downloads, web browsing, etc.) with a wireless communication system. The modem may provide network connectivity using any digital mobile network technology, including, for example, LTE, LTE advanced (4G), CDPD, GPRS, EDGE, UMTS, 1×RTT, EVDO, HSDPA, WLAN (e.g., Wi-Fi® network), etc. In the depicted embodiment, the modem can use the RF circuitry to radiate electromagnetic energy on the antennas to communicate data to and from the user device in the respective frequency ranges. In other embodiments, the modem may communicate in different communication types (e.g., WCDMA, GSM, LTE, CDMA, WiMAX, etc.) in different cellular networks. It should be noted that radiation enables the functionality of both transmission and receiving data using reciprocity.

In one embodiment, the OFDMA system 204 is implemented as hardware, software, firmware, or any combination thereof in a digital domain, an analog domain, or both. In other embodiments, the OFDMA system 204 includes an OFDMA block in a digital domain and analog front-end circuitry in the RF domain.

Figure 3:
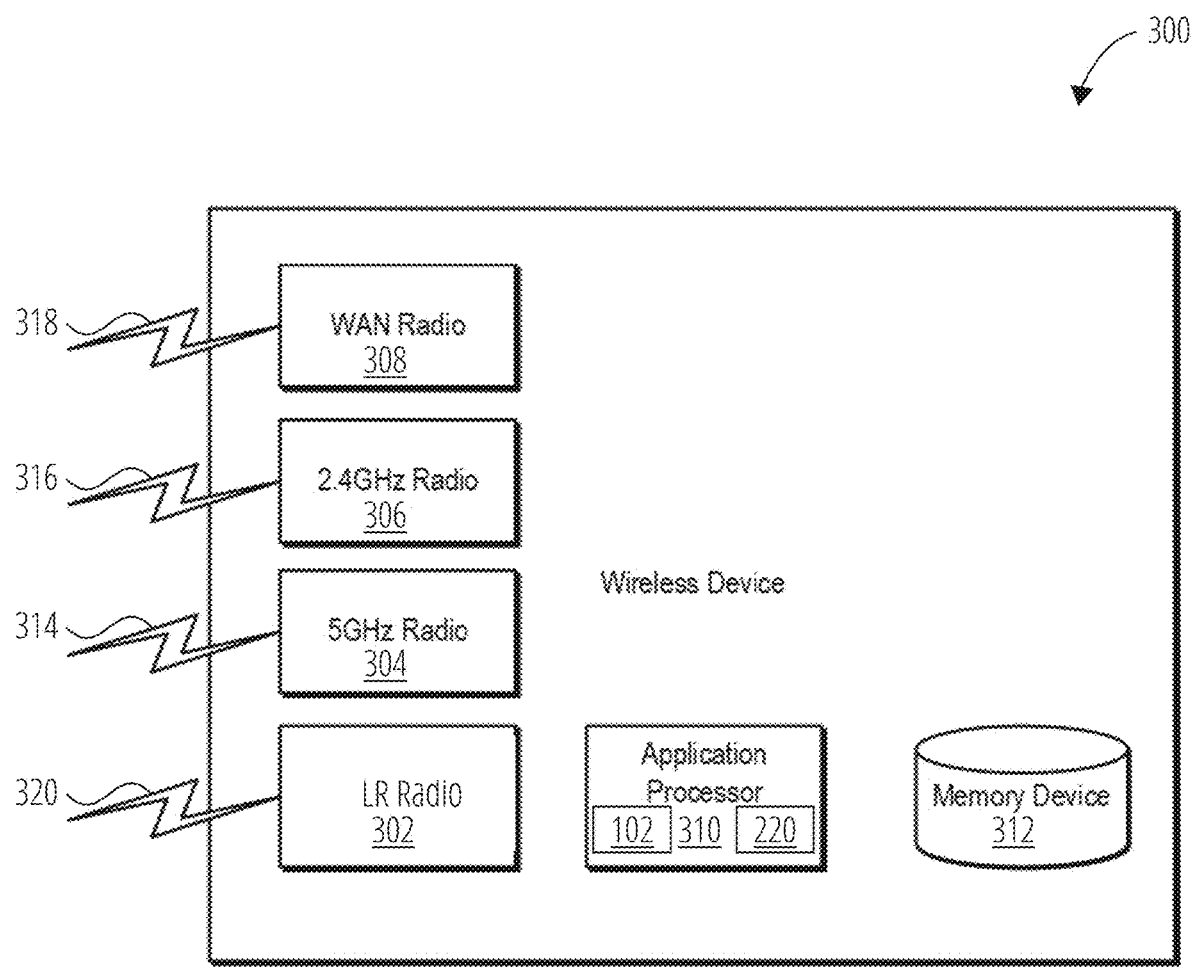
FIG. 3 is a block diagram of a wireless device with multiple radios, including rate-adaptation logic and receiver-gain control logic, according to one embodiment.

FIG. 3 is a block diagram of a wireless device 300 with multiple radios, including rate-adaptation logic 102 and receiver-gain control logic 220, according to one embodiment. The wireless device 300 also includes LR radio 302, a 5 GHz radio 304, a 2.4 GHz radio 306, and a wide area network (WAN) radio 308 (e.g., cellular radio). The LR radio 302 creates a wireless connection 320 between the wireless device 300 and another wireless device (not illustrated in FIG. 3). The LR radio 302 can be a low-power, long-range radio, such as a low-power, long-range wide area network (LPWAN) radio, for example, a wireless radio that uses the LoRa® (Long Range) technology. The 5 GHz radio 304 creates a first wireless connection 314 between the wireless device 300 and another wireless device (not illustrated in FIG. 3). The 2.4 GHz radio 306 creates a wireless connection 316 between the wireless device 300 and a wireless device (not illustrated). It should be noted that the 2.5 GHz radio can be used for communications in a PAN (e.g., Bluetooth®, Zigbee®, or the like). The WAN radio 308 creates a cellular connection between the wireless device 300 and a device in a cellular network (not illustrated). In other embodiments, more than one 2.4 GHz radio may be used for more wireless connections. Alternatively, a different number of 5 GHz radios may be used for more or less wireless connections with other nodes. In other embodiments, multiple cellular radios may be used to create multiple cellular connections.

In at least one embodiment, the LR radio 302 utilizes the LoRa® technology. In another embodiment, the LR radio 302 is a LRWAN radio. In another embodiment, the LR radio 302 is a sub-gigahertz frequency range. For example, a sub-gigahertz radio operates in the industrial, scientific, and medical (ISM) spectrum bands below 1 GHz, such as in the 769-935 Megahertz (MHz), 315 MHz, and 468 MHz frequency range. The sub-gigahertz radio can be similar to radios used in Internet of Things (IoT) applications.

The wireless device 300 includes an application processor 310 (e.g., a processing device) and a memory device 312 (e.g., for memory and/or storage). In some embodiments, the memory device 312 can store files, control and command data, as well as the aggregate data described herein. The memory device 312 may be volatile memory, non-volatile memory, or a combination of both. The application processor 310 can be coupled to each of the radios. The application processor 310 can include rate-adaptation logic 102, the receiver-gain control logic 220, or both. The rate-adaptation logic 102 can include processing logic that comprises hardware (e.g., circuitry, dedicated logic, programmable logic, microcode, etc.), software, firmware, or a combination thereof. The operations of the rate-adaptation logic 102 are described in more detail below with respect to FIG. 4A to FIG. 6. The receiver-gain control logic 220 can include processing logic that comprises hardware (e.g., circuitry, dedicated logic, programmable logic, microcode, etc.), software, firmware, or a combination thereof. The operations of the receiver-gain control logic 220 are described in more detail below with respect to FIG. 9 to FIG. 11.

As described above, rate adaptation in a traditional wireless communication system is focused on maximizing system throughput. The CSI, as observed by the receiver, can be fed back to the transmitter such that the transmitter can adapt the bitrate to best suit the current channel condition. Traditional schemes use CSI, such as average SNR, which is directly related to the average RSSI and signal bandwidth. Such a system works well in slow-varying channel conditions when the CSI does not change significantly across multiple packets. In other words, CSI is still applicable at the time when a new rate/modulation is selected. This may not be feasible if the channel changes rapidly, deeming the selected rate sub-optimal most of the time.

Figure 5:
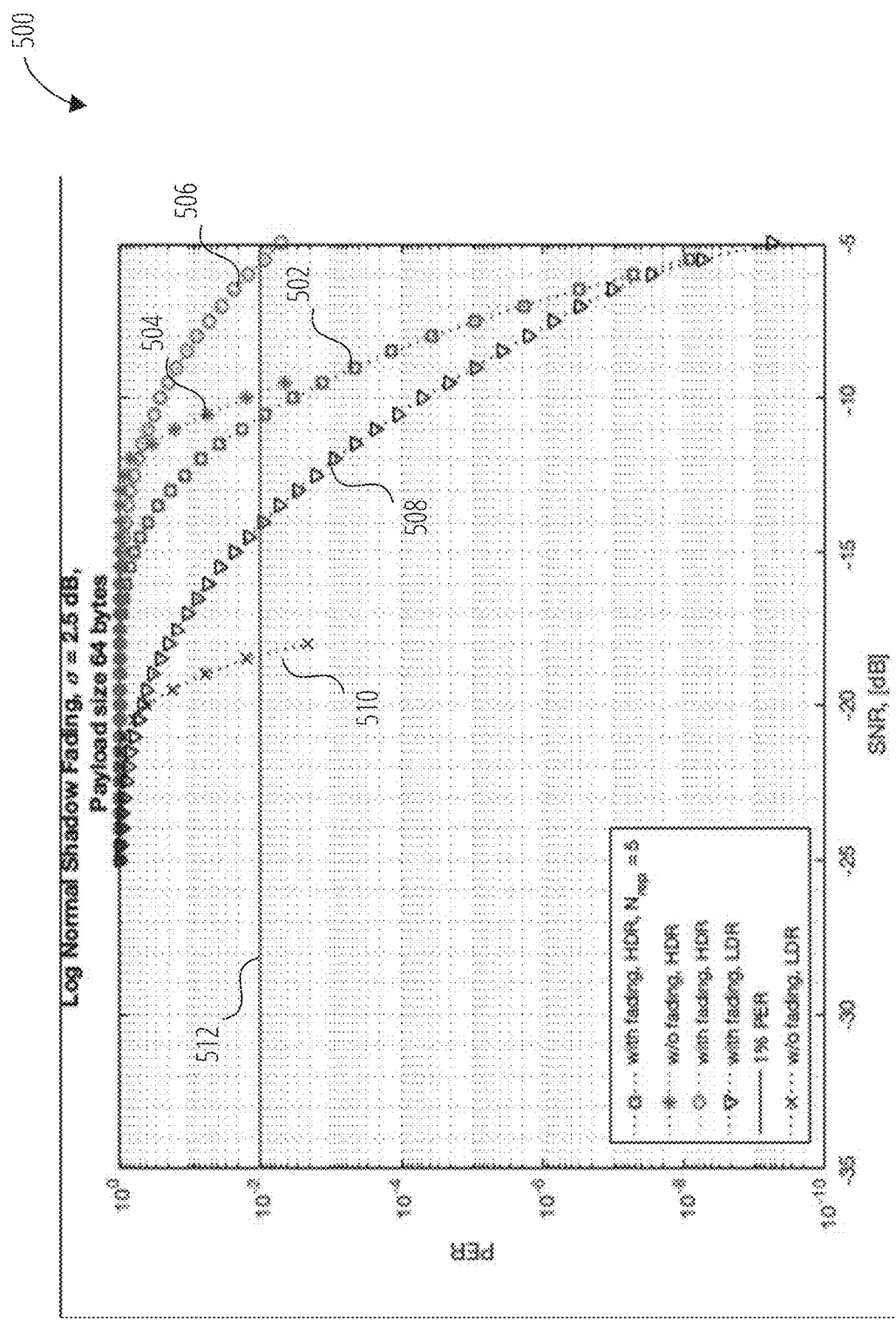
FIG. 5 is a graph illustrating simulation results of adaptive modulation with and without compensation for shadow fading at a first standard deviation, according to at least one embodiment.
Figure 6:
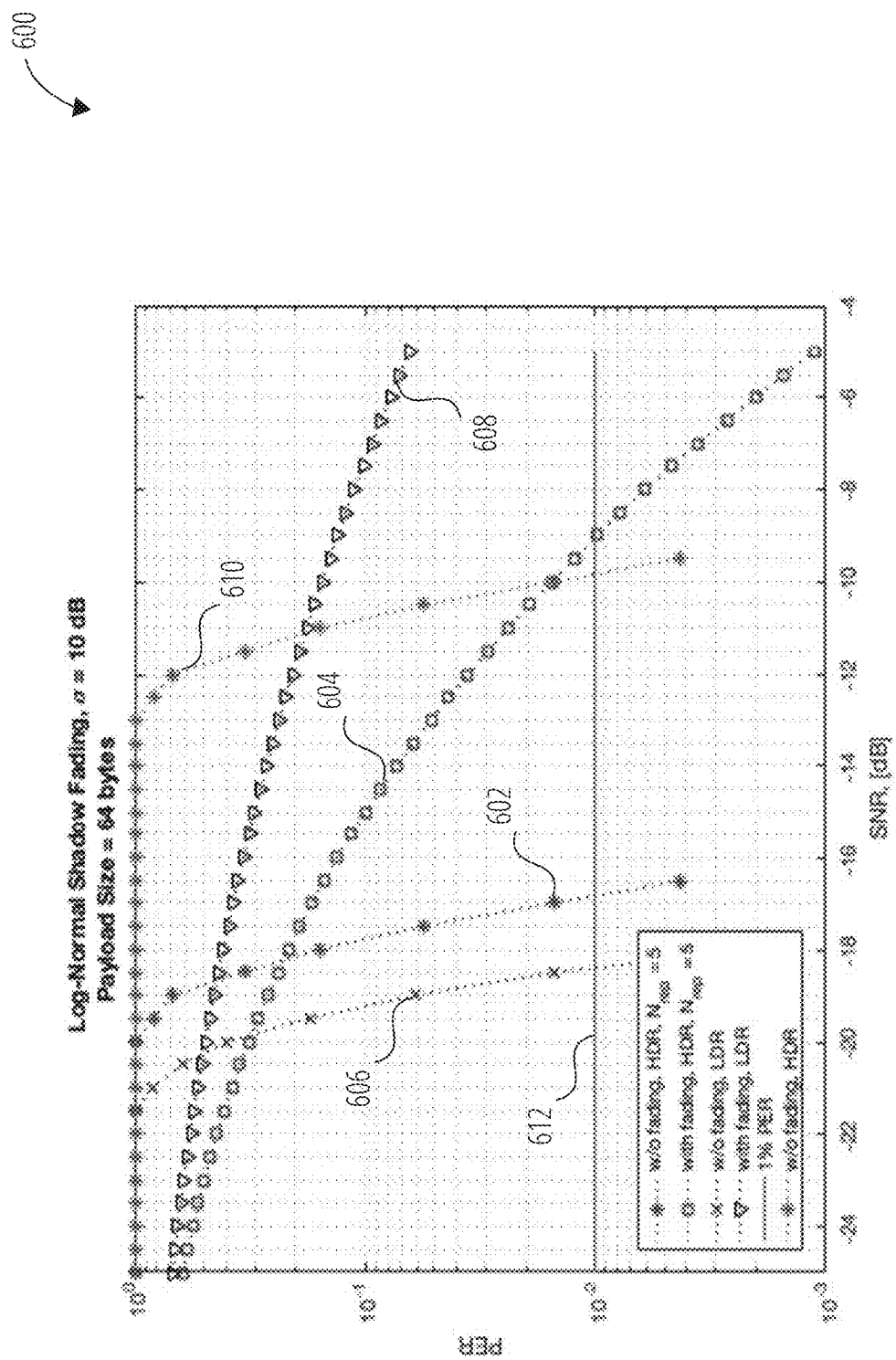
FIG. 6 is a graph illustrating simulation results of adaptive modulation with and without compensation for shadow fading at a second standard deviation, according to at least one embodiment.

The rate-adaptation logic, in contrast, balances system throughput and reliability of communications. The rate-adaptation logic considers channel statistics observed over a multiple packet timeframe and adapts the rate (or other aspects of the modulation and coding schemes) based on not only the mean value but also the standard deviation of the CSI (or set of RSSI samples). Such as illustrated in FIG. 5 and FIG. 6, simulation results show that when the channel variations are large, it is more advantageous to switch to higher bitrates with shorter packet durations and use packet repetitions instead of switching to lower bitrates with longer packet durations. Both options will result in similar bit-rate, but the shorter packets (with higher bit-rate) will have more chances to take advantage of time diversity (TD) through different channel conditions to take advantage of time diversity (TD). This also helps in mitigating the effects of sporadic interference. The path loss and the random Shadow Fading can be defined as follows:

$$PL = P_{TXdBm} - P_{RXdBm} = PL_0 + 10\rho\log_{10}\frac{d}{d_0} + X_g \quad (1)$$

where the path-loss, PL, in dB represents the path loss between the transmitter (TX) and receiver (RX) devices. The Receive Signal Strength (RSS) is simply the difference between TX power and PL and is given in units of dBm. The exponent term, $\rho$, represents the path loss exponent. The path loss exponent affects the path loss due to environment obstructions, where $\rho=2$ is free space (a.k.a. Line of Sight). Typically, $\rho=6$ is in areas with large buildings, where RSS drops quickly versus distance. The term $X_g$ represents the random variable reflecting the attenuation due to fading. In the case of log-normal shadow fading, $X_g$ follows a Gaussian distribution. The term, $\sigma$, is the standard deviation of the RSSI values, in units of dB. The variations in the signal level are due to obstacles in the path between the transmitter (TX) and receiver (RX). The standard deviation, σ, can be computed by analyzing the histogram of the RSSI of the received signal at a given location and evaluating its standard deviation after the mean (average) is removed. The time-dependent term, $\gamma = \gamma_{Avg}$ represents the average signal-to-noise ratio (SNR) in units of dB. The SNR, γ in dB, depicts the level of the received signal relative to the Hardware specific thermal noise floor. It is directly related to the TX power minus Path-loss level relative to the thermal noise level. The term, $\gamma_{sens}$, represents the minimum SNR that can be successfully received, i.e., the sensitivity limit for a given signal bandwidth. When the instantaneous SNR $\gamma < \gamma_{sens}$, no signal can be detected successfully due to the device's sensitivity limit. Different modulation schemes will result in different sensitivity limits.

The traditional scheme would only consider yto choose between a first data rate modulation scheme (LDR) and a second data rate (HDR). With the proposed rate-adaptation logic, the acceptance criteria on whether the first data rate modulation scheme (LDR) is better than a second modulation scheme plus time diversity (HDR+TD) depends upon not only the average SNR value, γ, at a given location but also the standard deviation, σ, at that location. When the standard deviation is less than the standard deviation threshold ($\sigma < \sigma_0$), then the first data rate modulation scheme (LDR) should be used. When the standard deviation is greater than the standard deviation threshold ($\sigma > \sigma_0$), then the second data rate modulation scheme (HDR+TD) should be used. The required number of packet repetitions, $Nr_{ep}$, and the threshold standard deviation Go, need to be adapted based on the available LDR and HDR bit rates used in the system. The decision should be based on system simulations or measurements and be entered in a look-up table.

In at least one embodiment, the standard deviation of the RSSI samples for a sample size of N can be calculated as follows:

$$\sigma = \sqrt{\frac{1}{N} \sum_{i=1}^{N} |RSSI_i - \mu|^2}, \quad (2)$$

where μ is the average mean of the first N RSSI samples and computed as:

$$\gamma = \frac{1}{N} \sum_{i=1}^{N} RSSI_i. \quad (3)$$

The variation on the RSSI samples equals the standard deviation squared, $\sigma^2$. The sample size, N, can be determined by a hardware implementation to achieve a certain confidence interval. Typically, a 95% confidence interval can be targeted. Then, the moving average $\gamma_k$ and moving standard deviation, $\sigma_k$, with the next and current N RSSI samples, can be calculated and considered for the rate adaptation. The sample size, N, should also depend on the rate at which the channel is expected to change. N should be large enough to calculate and track the variations in the channel.

For a typical distribution of the time-varying RSSI samples, 99.7% of their values are within three standard deviations, $\gamma \pm 3\sigma$. This is referred to as the empirical rule.

Furthermore, when the rate-adaptation logic 102 switches to HDR+TD, the transmitter (TX) waits at least two times the coherence time to pass before it repeats the HDR packet over the air again. The computation of the coherence time is described below with respect to FIG. 8. This maximizes the benefits of time diversity. The coherence time, $T_{coherence}$, refers to when the channel is expected to remain flat with a 50% correlation. Hence, the rate-adaptation logic 102 (and transmitter) waits for at least two times the coherence time to pass before repeating the HDR packet. Coherence time depends on the mobility of the transmitter (TX), which determines the rate at which the channel changes. Hence, the device's velocity is considered in computing the coherence time. The velocity can be computed if the device's location can be tracked over time. In other embodiments, the speed of the device can be used instead of velocity or in addition to velocity. For example, the device can be located in a vehicle, and data from the speedometer can be used to determine the speed of the device. Alternatively, data for determining the change of position over time can be obtained from different types of devices or systems and can be determined using other techniques.

Rate Adaptation

Figure 4A:
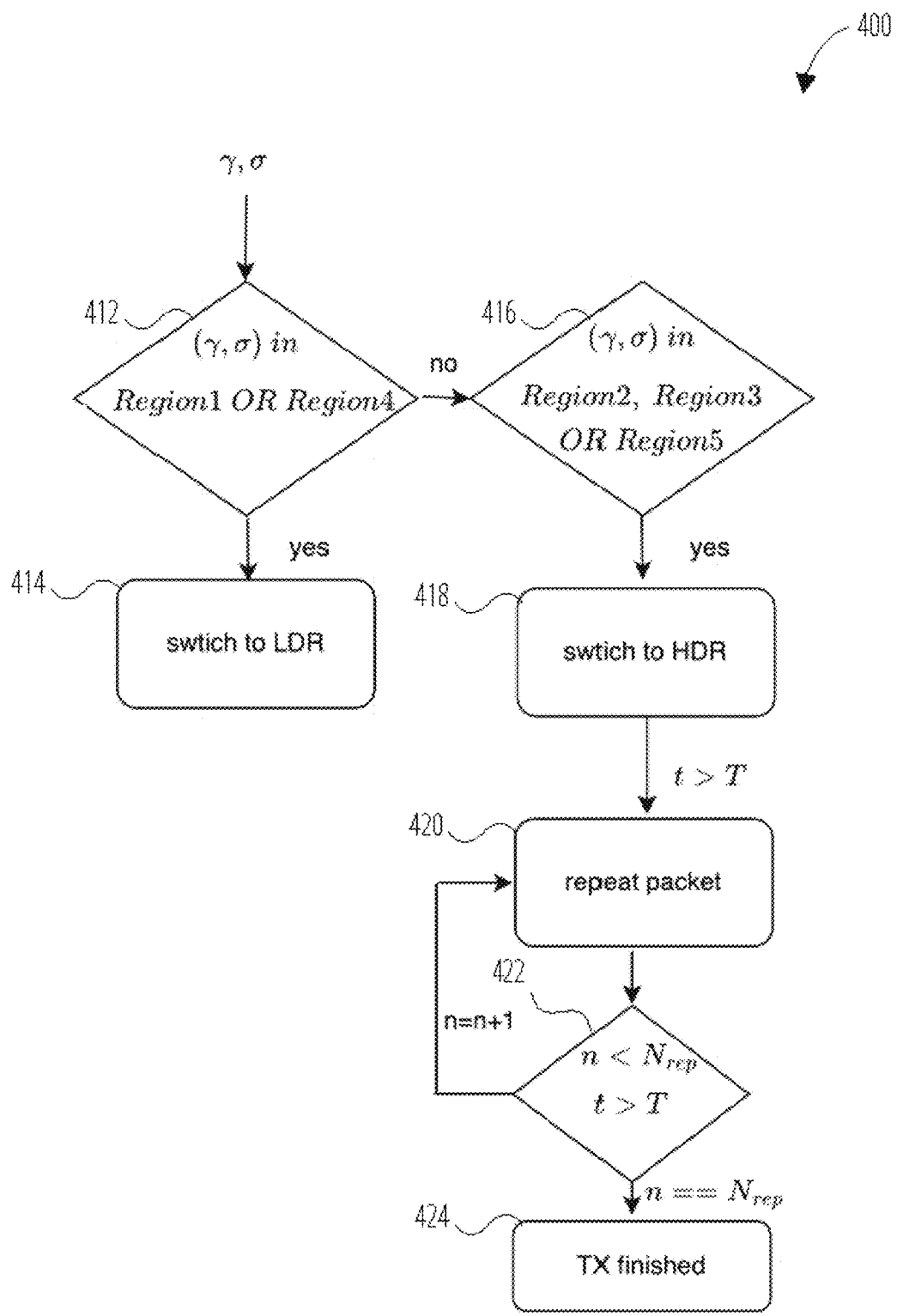
FIG. 4A is a flow diagram of a method of rate adaptation based on average SNR and standard deviation according to at least one embodiment.

FIG. 4A is a flow diagram of a method 400 of rate adaptation based on average SNR and standard deviation according to at least one embodiment. The method 400 can be performed by processing logic that comprises hardware (e.g., circuitry, dedicated logic, programmable logic, microcode, etc.), software, firmware, or a combination thereof. In one embodiment, the rate-adaptation logic 102 of FIG. 1 or FIG. 3 can perform the method 400. In another embodiment, a wireless device 300 can perform method 400. In another embodiment, a processing device can perform the method 400.

Figure 4B:
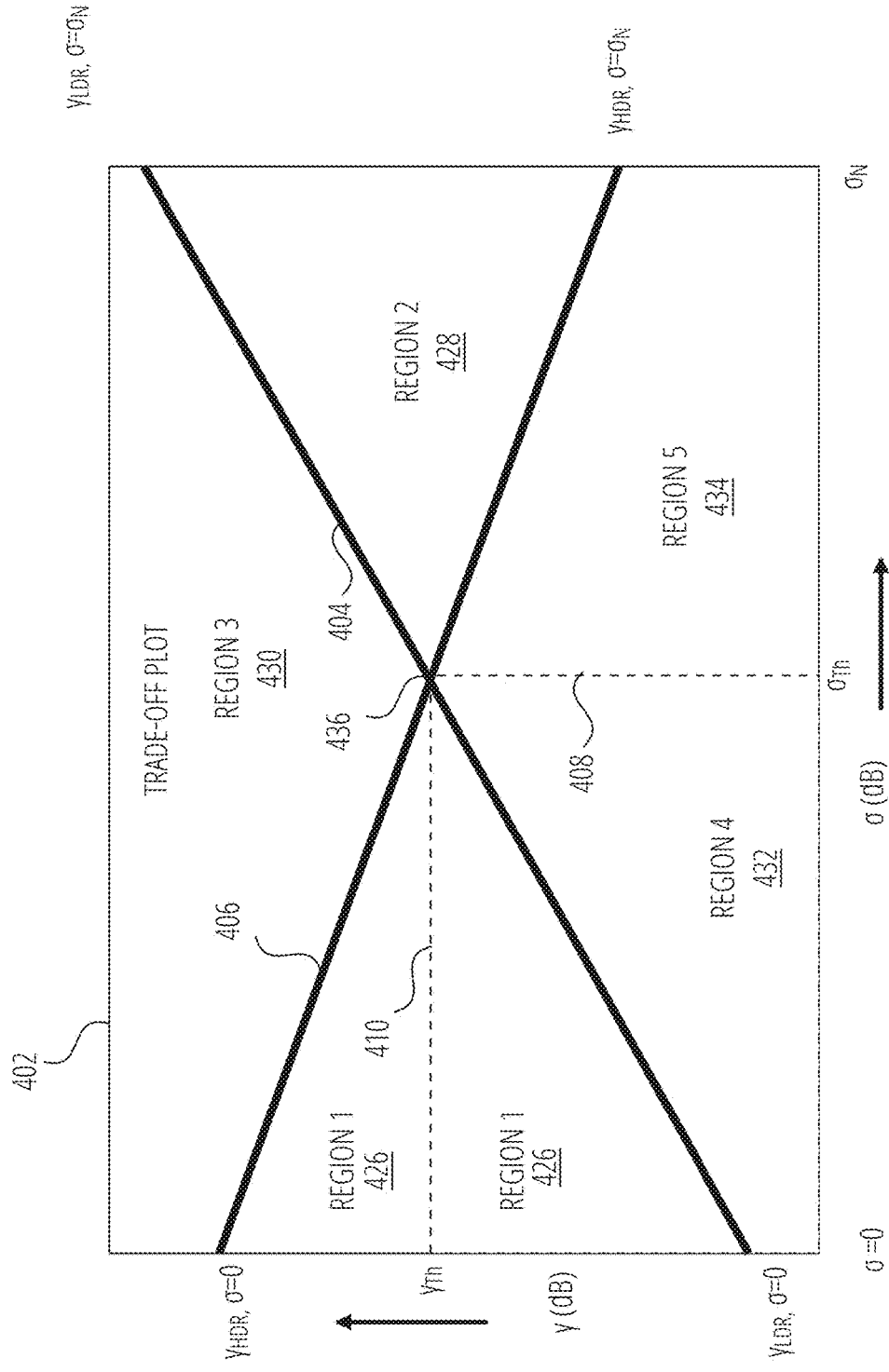
FIG. 4B illustrates a trade-off plot of standard deviation and average SNR to meet a target Packet Error Rate (PER) according to at least one embodiment.

For the method 400, the processing logic can generate a data structure, such as a trade-off plot 402 of standard deviation and average SNR to meet a target Packet Error Rate (PER), as illustrated in FIG. 4B. The data structure can be a look-up table stored in memory accessible by the processing logic. The data structure can provide mapping information, a map, or a mapping scheme that defines how a value pair (an SNR value and a standard deviation value) can correspond to different regions, where each region is assigned to one of the multiple data rate modulation schemes. If a current value pair is in a particular region, the modulation scheme associated with the region can be selected. The data structure can include five regions defined by the standard deviation threshold, a first slope of standard deviations and average SNRs to meet the target PER using the second modulation scheme, and a second slope of standard deviations and average SNRs to meet the target PER using the first modulation scheme. In at least one embodiment, the first slope corresponds to a minimum SNR required with a first modulation scheme at a given standard deviation to meet a target PER, and the second slope corresponds to the minimum SNR required with a second modulation scheme at a given standard deviation to meet the target PER.

As illustrated in FIG. 4B, the trade-off plot 402 includes five regions corresponding to different channel fading conditions and is defined by a first slope 404, a second slope 406, and a standard deviation threshold 408. The regions of the trade-off plot 402 can be used to select the data rate modulation scheme based on the average SNR (the mean of the RSSI samples) and the standard deviation of the RSSI samples. The first slope 404 corresponds to a minimum SNR required with a first data rate modulation scheme (e.g., LDR)

at a given standard deviation to meet the target PER. The second slope 406 corresponds to a minimum SNR required with a second data rate modulation scheme (e.g., HDR+time diversity (TD)) at a given standard deviation to meet the target PER. The second data rate modulation scheme has a higher data rate than the first data rate modulation scheme.

Referring to FIG. 4B, the trade-off plot 402 shows a sensitivity level $\gamma_{sens,LDR}$ that can be achieved with the first data rate modulation scheme (LDR) and a sensitivity level $\gamma_{sens,HDR}$ that can be achieved with the second data rate modulation scheme (HDR). Higher data rates require higher sensitivity limits. In other words, $\gamma_{sens,HDR} > \gamma_{sens,LDR}$. The trade-off plot 402 of SNR values versus standard deviation values for a certain target average PER. The first slope 404 represents the minimum $\gamma_{LDR}$ required with LDR modulation at a given σ to meet the required PER. When there is no variation in the RSSI, i.e., σ=0, the required SNR is simply the sensitivity limit, i.e., $\gamma_{LDR,\sigma=0} = \gamma_{sens,LDR}$. Similarly, the second slope 406 represents the minimum $\gamma_{HDR}$ required with HDR+TD at a given σ to meet the required PER. When σ=0, $\gamma_{HDR,\sigma=0} = \gamma_{sens,HDR}$, the threshold intersection point 436, i.e., ($\gamma_{Th}$, $\sigma_{Th}$), is the point of operation where both LDR and HDR+TD exhibit the same performance and choosing one versus the other would provide similar performance. Based on this, FIG. 4B shows five expected performance regions depending on the value of the (γ, σ) pair. These regions are used for selecting the best modulation.

For the method 400, the processing logic can obtain a set of RSSI samples associated with one or more packets transmitted by a transmitter to a receiver over a channel (i.e., a wireless communication channel). The set of RSSI samples includes a sample size of N samples corresponding to a rate at which the channel is expected to change. The processing logic determines a current value pair (γ, σ) includes a current average SNR value (γ) associated with the set of RSSI samples and a current standard deviation value (σ) associated with the set of RSSI samples.

Referring to FIG. 4A, the method 400 begins with the processing logic determining whether the current value pair (γ, σ) is in a first region 426 or a fourth region 432 of the trade-off plot 402 (block 412). The processing logic selects the first data rate modulation scheme (LDR) for a subsequent packet or a subsequent portion of the one or more packets responsive to the current value pair being in the first region 426 or a fourth region 432 of the trade-off plot 402 (block 414). The first region 426 corresponds to value pairs less than the second slope 406 and greater than the first slope 404, and the current standard deviation (σ) is less than or equal to the standard deviation threshold 408. The fourth region 432 corresponds to value pairs that are less than the first slope 404, and the current standard deviation (σ) is less than the standard deviation threshold 408. If the current value pair (γ, σ) is not in the first region 426 or the fourth region 432, the processing logic determines whether the current value pair (γ, σ) is in a second region 428, a third region 430, or a fifth region 434 (block 416). The second region 428 corresponds to value pairs less than the first slope 404 and greater than the second slope 406, and the current standard deviation (σ) is greater than the standard deviation threshold 408. The third region 430 corresponds to value pairs greater than the first slope 404 and the second slope 406. The fifth region 434 corresponds to value pairs that are less than the second slope 406, and the current standard deviation (σ) is greater than the standard deviation threshold 408. The processing logic selects the second data rate modulation scheme (HDR+TD) for the subsequent packet or the subsequent portion of the one or more packets responsive to the current value pair being in the second region 428, third region 430, or fifth region 434 (block 418). After selecting the second data rate modulation scheme (HDR+TD), the processing logic can cause a current packet to be repeated after an amount of time equal to 2T (block 420). The time, T, represents a coherence time where the channel is expected to remain with a 50 percent correlation. The coherence time is based on a velocity of a device comprising the transmitter. The packet can be repeated a specified number of times ($N_{rep}$). The processing logic, at block 422, determines whether the packet has been repeated less than the specified number of times ($N_{rep}$) using an index, n. If the index has not reached the specified number of times ($N_{rep}$), the index, n, is incremented at returns to block 420 to repeat the current packet. Once the index, n, is equal to the specified number of times ($N_{rep}$) (n==$N_{rep}$), the transmission is finished (block 424), and the method 400 ends. The method 400 can be performed at a first instance with a first set of N RSSI samples. The method 400 can be repeated in subsequent instances using a moving average SNR value and a moving standard deviation value.

In at least one embodiment, when the current value pair (γ, σ) is in the first region 426, the first data rate modulation scheme (LDR) provides better performance than the second data rate modulation scheme (HDR+TD). That is, if the current standard deviation value (σ) is between zero and the standard deviation threshold 408 (0≤σ<$\sigma_{Th}$) and the current average SNR value (γ) falls in between the first slope 404 and the second slope 406 (i.e., the first region 426), then the first data rate modulation scheme (LDR) would provide better performance than that with the second data rate modulation scheme (HDR+TD). When the current value pair (γ, σ) is in the second region 428, the second data rate modulation scheme (HDR+TD) provides better performance than the first data rate modulation scheme (LDR). That is, if the current standard deviation value (σ), is greater than the standard deviation threshold 408 (σ>$\sigma_{Th}$) and the current average SNR value (γ) falls in between the first slope 404 and the second slope 406 (i.e., the second region 428), then the second data rate modulation scheme (HDR+TD) provides better performance than the first data rate modulation scheme (LDR). When the current value pair (γ, σ) is in the third region 430, either the first data rate modulation scheme (LDR) or the second data rate modulation scheme (HDR+TD) can provide the same performance and would meet the required target PER. The second data rate modulation scheme (HDR+TD) could provide an additional advantage in combating interference due to the short airtime of the packet and the multiple repeated packets. As such, the second data rate modulation scheme (HRD+TD) provides better performance than the first data rate modulation scheme (LDR). That is, if the current average SNR value (γ) is above the first slope 404 and the second slope 406 (i.e., the third region 430), then the second data rate modulation scheme (HDR+TD) provides better performance than the first data rate modulation scheme (LDR). An intersection point 436 of the first slope 404 and the second slope 406 is a point of operation where both the first data rate modulation scheme (LDR) and the second data rate modulation scheme (HDR+TD) exhibit the same performance. For the current standard deviation value (σ) being greater than 0 (σ>0), when the current value pair (γ, σ) falls in either the fourth region 432 or fifth region 434, both the first data rate modulation scheme (LDR) or the second data structure (HDR+TD) would not meet the required target PER. If, in the best case of shadow fading, the instantaneous SNR value plus three times the standard deviation (γ+3σ) falls in the fourth region 432, then the first data rate modulation scheme (LDR) can be selected as the default modulation scheme. Whereas, if the instantaneous SNR value plus three times the standard deviation (γ+3σ) falls in the fifth region 434, then the second data rate modulation scheme (HDR+TD) can be selected.

As described above, the five regions of the trade-off plot 402 can be used for adapting the modulation to the channel fading conditions. The processing logic can achieve better performance than conventional approaches that adapt the modulation based on the average SNR, as illustrated in FIG. 5 and FIG. 6.

FIG. 5 is a graph 500 illustrating simulation results of adaptive modulation with and without compensation for shadow fading at a first standard deviation (e.g., σ=2.5 dB), according to at least one embodiment. The simulation results show the SNR values and PER values when using HDR with 5 packet repetition 502, HDR without fading 504, HDR with fading 506, LDR with fading 508, and LDR without fading 510. The threshold corresponding to 1% PER 512 is illustrated for reference.

FIG. 6 is a graph 600 illustrating simulation results of adaptive modulation with and without compensation for shadow fading at a second standard deviation (e.g., σ=10 dB), according to at least one embodiment. The simulation results show the SNR values and PER values when using HDR without fading and five packet repetition 602, HDR with fading and 5 packet repetition 604, LDR without fading 606, LDR with fading 608, and HDR without fading 610. The threshold corresponding to 1% PER 612 is illustrated for reference.

As illustrated in FIG. 5 and FIG. 6, the system performance is better than the traditional scheme, as evidenced by the simulation results. As the results show, when σ is small, the PER with LDR is always better (i.e., smaller) than that with HDR. For example, if the target is PER<1%, then the TX can switch to LDR when σ=2.5 dB. However, when the channel variations are large, e.g., when σ=10 dB, the PER simulations show that switching the bitrate to HDR+TD with for e.g., 5 packet repetitions is beneficial. This is because packet repetitions cultivate the large variations in the channel and bring in diversity gain. In order for the transmission to fail, all these five packets must go through a deep fade, which is not likely to happen due to large variation. It is highly probable that at least one of them will see a very good channel (i.e., a large γ).

Figure 7:
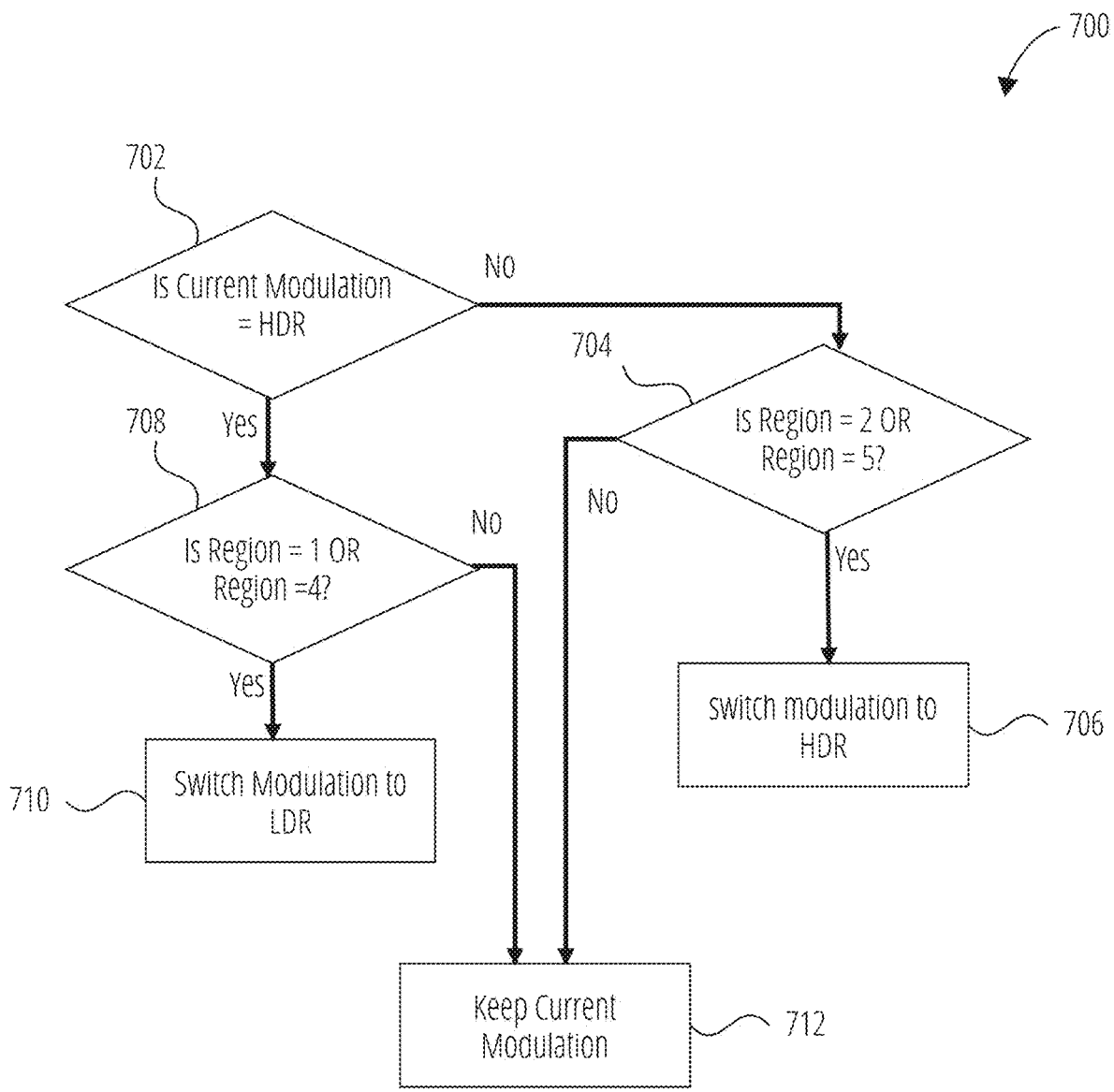
FIG. 7 is a flow diagram of a method of modulation scheme switching based on average SNR and standard deviation according to at least one embodiment.

FIG. 7 is a flow diagram of a method 700 of modulation scheme switching based on average SNR and standard deviation according to at least one embodiment. The method 700 can be performed by processing logic that comprises hardware (e.g., circuitry, dedicated logic, programmable logic, microcode, etc.), software, firmware, or a combination thereof. In one embodiment, the rate-adaptation logic 102 of FIG. 1 or FIG. 3 can perform the method 700. In another embodiment, a wireless device 300 can perform method 700. In another embodiment, a processing device can perform the method 700.

Referring to FIG. 7, the method 700 begins with the processing logic determining whether the current modulation is set to a first modulation scheme with a higher data rate (HDR) (block 702). If the current modulation is set to the first modulation scheme at block 702, the processing logic determines if a current value pair is in a first region or a fourth region (block 708). The first region (e.g., 426) corresponds to value pairs that are less than a second slope (e.g., 406) and greater than a first slope (e.g., 404), and a current standard deviation (σ) is less than or equal to a standard deviation threshold (e.g., 408). The fourth region corresponds to value pairs that are less than the first slope (e.g., 404) and the current standard deviation (σ) is less than the standard deviation threshold (e.g., 408).

If not, the processing logic keeps the current modulation set to the first modulation scheme (HDR) (block 712). However, if the current value pair is in the first region or the fourth region at block 708, the processing logic switches the current modulation to a second modulation scheme with a lower data rate (LDR) (block 710). If the current modulation is not set to the first modulation scheme at block 702 (i.e., meaning the current modulation is set of LDR), the processing logic determines whether the current value pair is in a second region or a fifth region (block 704). If the current value pair is not in the second region or the fifth region, the processing logic keeps the current modulation set to the second modulation scheme (LDR) (block 712). However, if the current value pair is in the second region or the fifth region at block 704, the processing logic switches the current modulation to the first modulation scheme (HDR) (block 706).

In another embodiment, the second region and the fifth region at block 704 correspond to a first threshold criterion at block 704, and the first region and the fourth region at block 708 correspond to a second threshold criterion. The second threshold criterion corresponds to a standard deviation threshold between the first modulation scheme and the second modulation scheme. The processing logic can determine whether the current standard deviation value satisfies the second threshold criterion (e.g., less than the standard deviation threshold 408), and select the second modulation scheme with the second data rate less than the first data rate at block 710. The first threshold criterion corresponds to a minimum SNR required with the first modulation scheme at the current standard deviation value to meet a target PER. The processing logic can determine whether the current standard deviation value meets the target PER for the given SNR value. The processing logic can select the first modulation scheme having the first data rate at block 706.

As described above, 99.7% of their values are within three standard deviations γ+3σ (i.e., the empirical rule) for a typical distribution of the time-varying RSSI samples. Furthermore, when the rate-adaptation logic switches to HDR+TD, the transmitter (TX) waits at least two times the coherence time ($T_{coherence}$) to pass before it repeats the HDR packet over the air again. The computations of a packet repetition time (T) and a coherence time ($T_{coherence}$) are depicted in FIG. 8.

Figure 8:
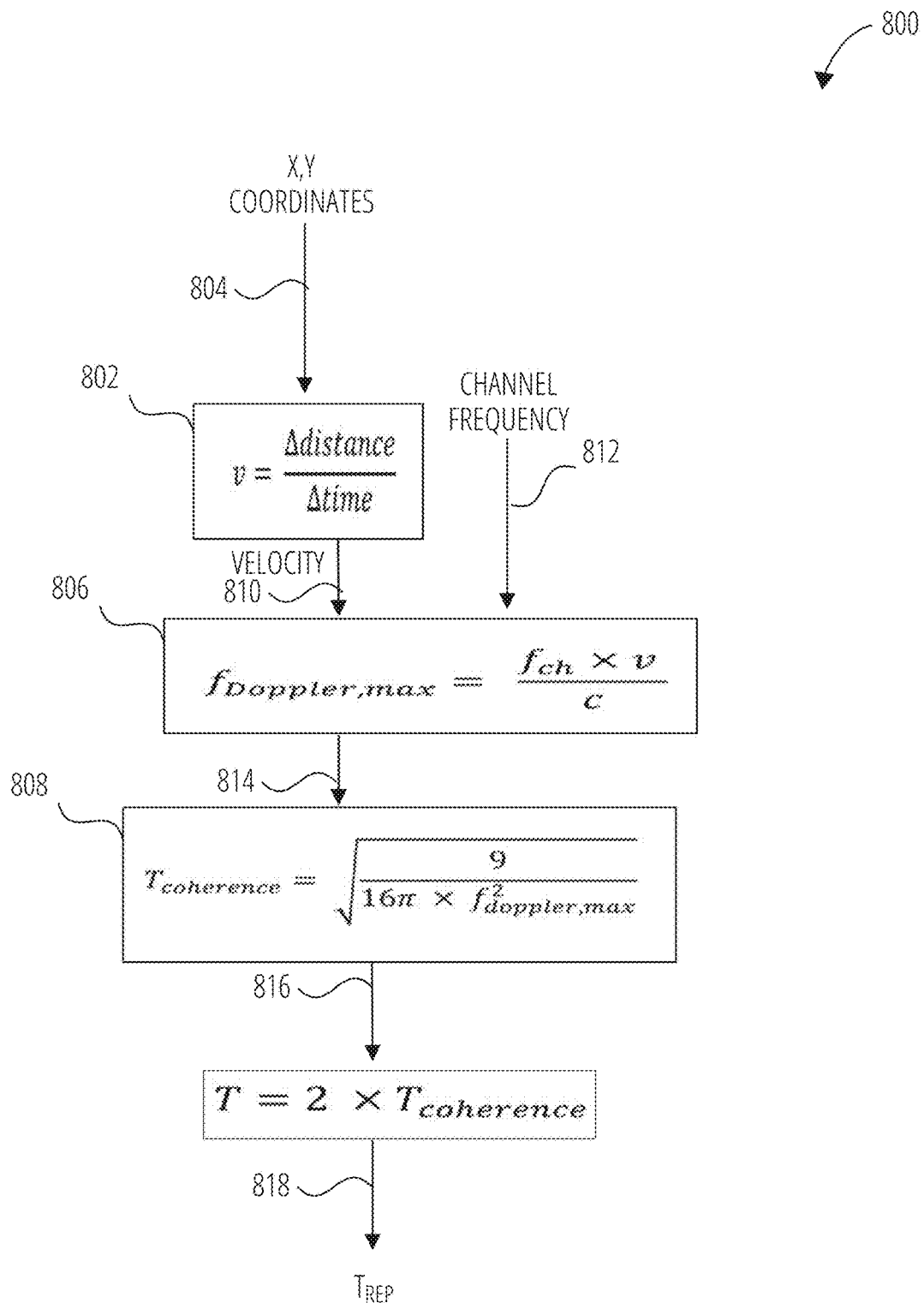
FIG. 8 is a flow diagram of a method of computing a packet repetition time ($T_{rep}$) based on coordinates of the transmitter device according to at least one embodiment.

FIG. 8 is a flow diagram of a method 800 of computing a packet repetition time ($T_{rep}$) based on coordinates of the transmitter device according to at least one embodiment. The method 800 can be performed by processing logic that comprises hardware (e.g., circuitry, dedicated logic, programmable logic, microcode, etc.), software, firmware, or a combination thereof. In one embodiment, the rate-adaptation logic 102 of FIG. 1 or FIG. 3 can perform the method 800. In another embodiment, a wireless device 300 can perform method 800. In another embodiment, a processing device can perform the method 800.

Referring to FIG. 8, the method 800 begins with the processing logic calculating a velocity 810 of the transmitter device (block 802). The processing logic calculates the velocity 810 using coordinates 804 (e.g., X,Y coordinates) of the transmitter device. The processing logic can retrieve the coordinates 804 from a navigation system (e.g., GPS device or other dead reckoning processes). The processing logic can determine the velocity 810 using other information, such as from an accelerometer, a gyroscope, or the like. The processing logic can determine a Doppler value 814 using the velocity 810 and a channel frequency 812 (block 806). In at least one embodiment, the processing logic calculates the Doppler value 814 using the following equation:

$$f_{Doppler,max} = \frac{f_{ch} \times v}{c}. \quad (4)$$

The processing logic can determine a coherence time 816 using the Doppler value 814 (block 808). In at least one embodiment, the processing logic calculates the coherence time 816 using the following equation:

$$T_{coherence} = \sqrt{\frac{9}{16\pi \times f_{Doppler,max}^2}}. \quad (5)$$

This maximizes the benefits of time diversity. The coherence time 816, $T_{coherence}$, refers to the time when the channel is expected to remain flat with a 50% correlation. The processing logic determines the packet repetition time ($T_{rep}$) 818. Hence, the transmitter device waits for at least two times the coherence time 816 ($2 \times T_{coherence}$) to pass before repeating the HDR packet. As described above, coherence time 816 depends on the mobility of the TX, which determines the rate at which the channel changes. Hence, the velocity 810 of the transmitter device is considered by computing the coherence time. The velocity 810 can be computed if the device's location can be tracked over time.

RX-Gain Adaptation

In this section, RX-gain adaptation technologies are presented to reduce the impact of a fast-fading channel. In a conventional Receiver-Automatic Gain Control (RX-AGC), the RX-gain in a receiver is controlled such that the signal presented to an analog-to-digital converter (ADC) by a low-noise amplifier (LNA) (or from any mixer or filtering following the LNA), is not clipped. RX-AGC ensures that the gain is backed off sufficiently to save power.

Figure 9:
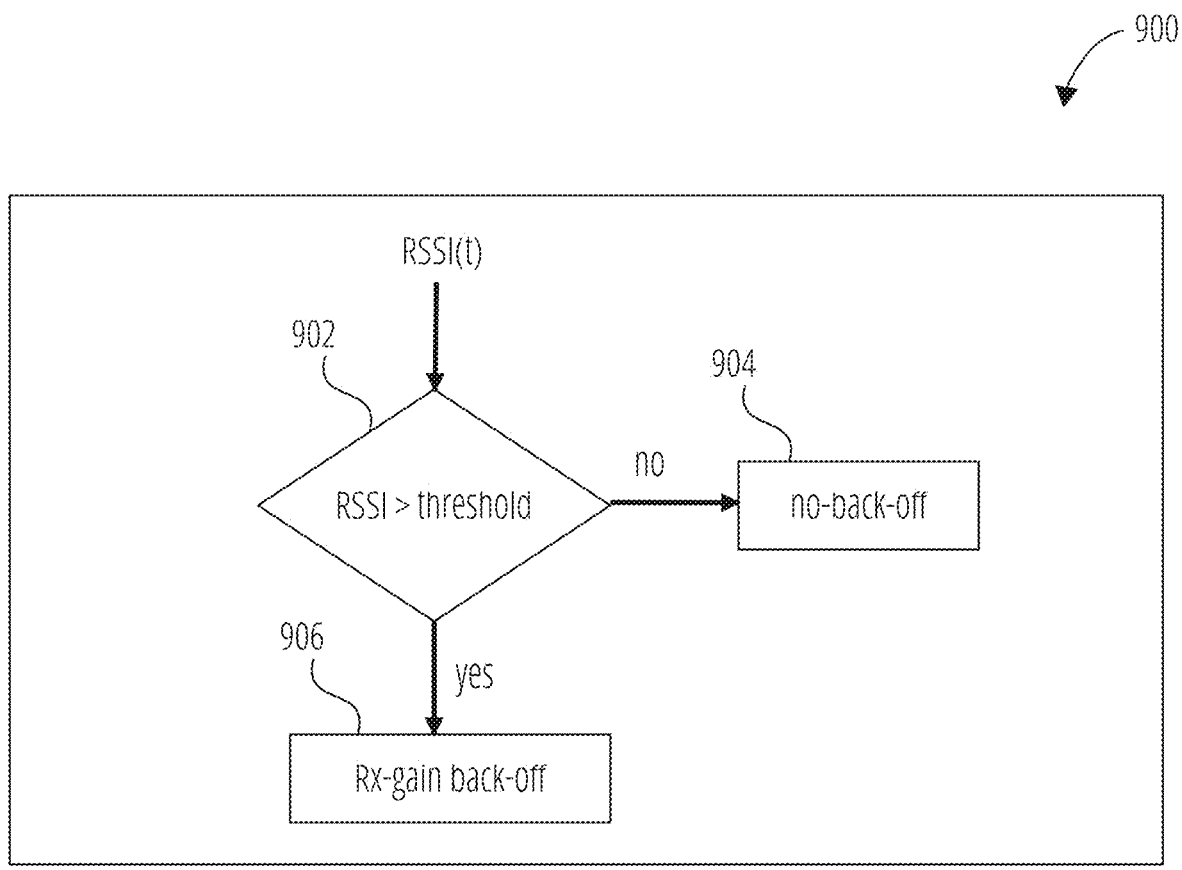
FIG. 9 is a flow diagram of a traditional Receiver-Automatic Gain Control (RX-AGC) algorithm according to at least one implementation.

FIG. 9 is a flow diagram of a traditional RX-AGC algorithm according to at least one implementation. The traditional RX-AGC algorithm starts with setting the RX-gain to the maximum. The traditional RX-AGC algorithm then determines whether an instantaneous RSSI value exceeds a threshold (block 902). The traditional RX-AGC algorithm can use an analog peak detector. When the threshold for clipping is exceeded, as detected by the analog peak detector at block 902, the RX-gain is backed off until the peak detector is no longer detecting a signal saturation which can result in significant signal distortion (block 906). When the threshold for clipping is not exceeded, the RX-gain is not backed off (block 904). Such RX-gain adjustments are made only during the preamble detection stage, after which the RX-AGC freezes its gain during the header and payload reception. In the case when signal RSS is sufficiently low, and hence there is no saturation detected, then the RX-gain is typically dropped to save power as long as RSSI has a sufficient margin above the sensitivity limit of the device. However, each time the RX-gain is dropped, the Noise Figure (NF) of the receiver is degraded. This becomes problematic only if the signal is near sensitivity. In such a case, where the signal is near the sensitivity threshold, then the RX-AGC keeps the gain at maximum gain. Let this threshold be referred to as the sensitivity threshold for no back-off. It can be tens of dBs away from the device's sensitivity level and depends on the vendor implementation as they tradeoff NF, AGC settling time, and power consumption metrics.

Figure 10:
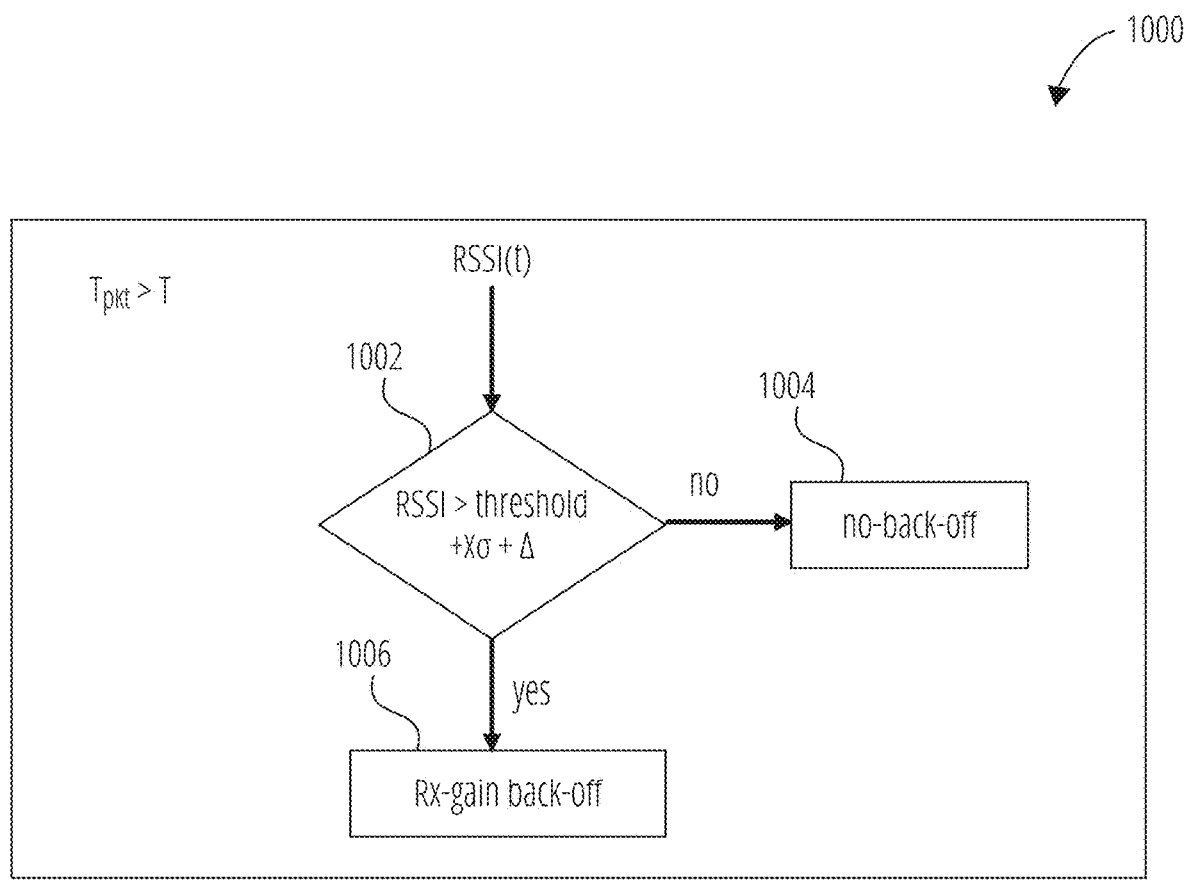
FIG. 10 is a flow diagram of an RX-AGC algorithm that uses the standard deviation for fast fading under mobility according to at least one embodiment.
Figure 11:
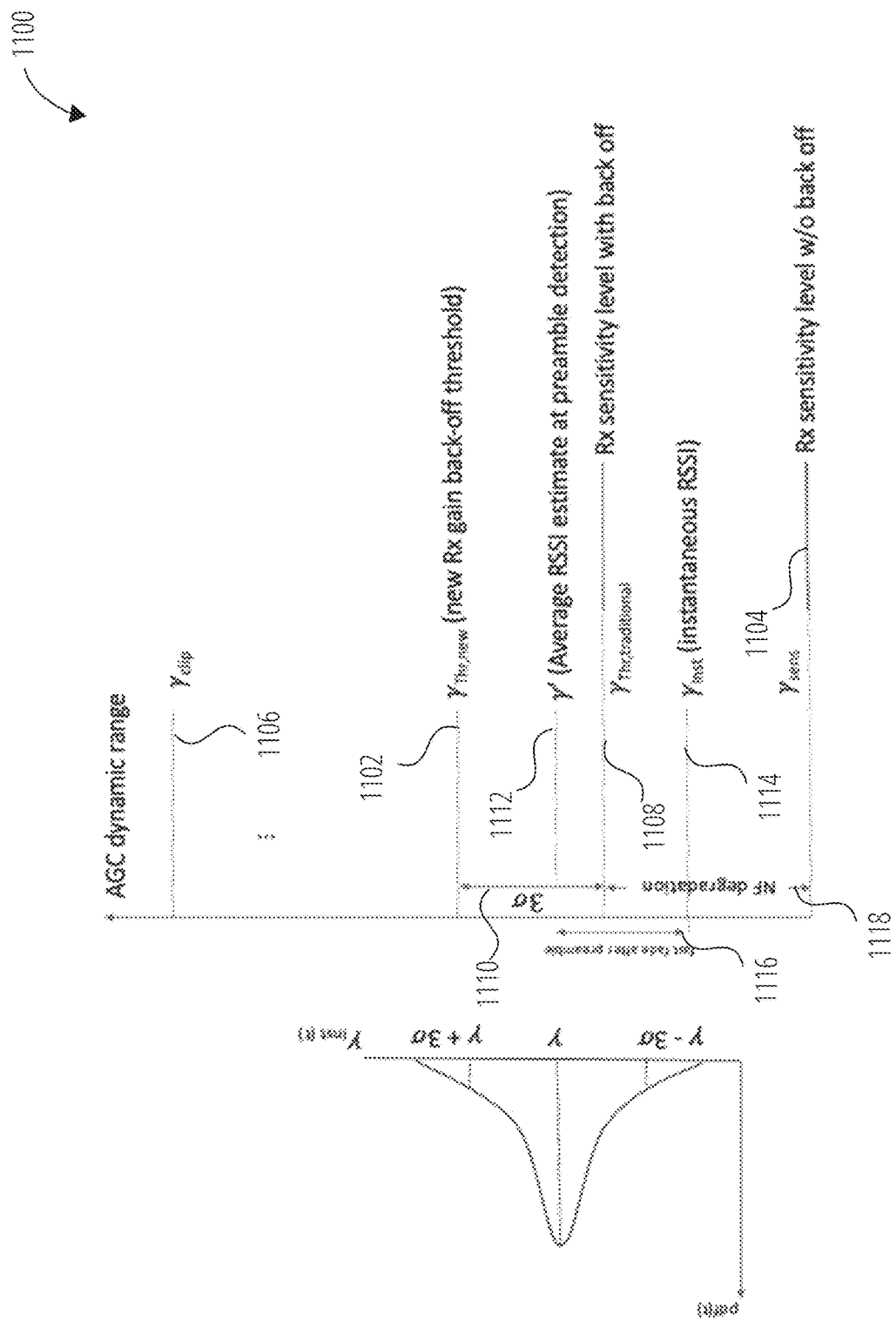
FIG. 11 illustrates an RX-AGC dynamic range with a back-off threshold with an additional margin based on the standard deviation according to at least one embodiment.

Instead of backing off the RX-gain when the threshold is exceeded, aspects and embodiments of the present disclosure can drop the RX-gain off only if an additional margin is exceeded as well, as illustrated in FIG. 10 and FIG. 11.

FIG. 10 is a flow diagram of an RX-AGC algorithm 1000 that uses the standard deviation for fast fading under mobility according to at least one embodiment. The RX-AGC algorithm 1000 starts with setting the RX-gain to the maximum. The RX-AGC algorithm 1000 can use an analog peak detector. The RX-AGC algorithm 1000 then determines whether an instantaneous RSSI value exceeds a threshold plus an additional margin (block 1002). The additional margin is set to compensate for shadow fading. In at least one embodiment, the additional margin is set to the worst-case anticipated shadow fading, which can be three standard deviations, $3\sigma$, per the 99.7% empirical rule. The standard deviation is calculated across the history of the RSSI values. This ensures that the NF of the receiver is kept at the nominal value even when the RSSI drops post-preamble detection. In at least one embodiment, the additional margin is introduced only if the packet duration ($T_{pkt}$) is longer than the coherence time, $T_{coherence}$ ($T_{pkt} > T$). The coherence time, $T_{coherence}$, can already be calculated by the rate-adaptation algorithm described above. Alternatively, the RX-AGC algorithm 1000 can calculate the coherence time, $T_{coherence}$, for this purpose. The additional margin can help save power and improve immunity to interference that can appear post-preamble detection.

FIG. 11 illustrates an RX-AGC dynamic range 1100 with a back-off threshold 1102 with an additional margin based on the standard deviation according to at least one embodiment. The RX-AGC dynamic range 1100 is between an RX sensitivity level without back-off 1104 and a clipping threshold 1106. The back-off threshold 1102 is a threshold 1108 corresponding to RX sensitivity level with back-off, plus an additional margin 1110 to compensate for shadow fading. The back-off threshold 1102 is set to be closer to the clipping threshold 1106 than the threshold 1108 corresponding to the RX sensitivity level with back-off. The NF degradation is between the RX sensitivity level with back-off (e.g., threshold 1108) and the RX sensitivity level without back-off 1104. In at least one embodiment, the additional margin 1110 is set to the worst-case anticipated shadow fading, which can be three standard deviations, $3\sigma$, PER the 99.7% empirical rule. In another embodiment, the additional margin 1110 can be the three standard deviations, $3\sigma$, plus a delta ($\Delta$).

During operation, the receiver-gain control logic 220 can determine an average RSSI estimate at preamble detection 1112. After preamble detection, the receiver-gain control logic 220 can determine an instantaneous RSSI value 1114. The instantaneous RSSI value 1114 can indicate a fast fade 1116 after preamble detection. The fast fade 1116 can be detected because the back-off threshold 1102 is set higher than the threshold 1108 corresponding to the RX sensitivity level with back-off.

In at least one embodiment, the receiver-gain control logic 220 can set a receiver gain of the receiver to a maximum value. The receiver-gain control logic 220 can back off the receiver gain until a peak detector is no longer detecting a signal saturation responsive to the current average SNR value being greater than a sensitivity threshold value (e.g., threshold 1108) plus a value derived from the current standard deviation value (e.g., corresponding to the back-off threshold 1102).

Figure 12:
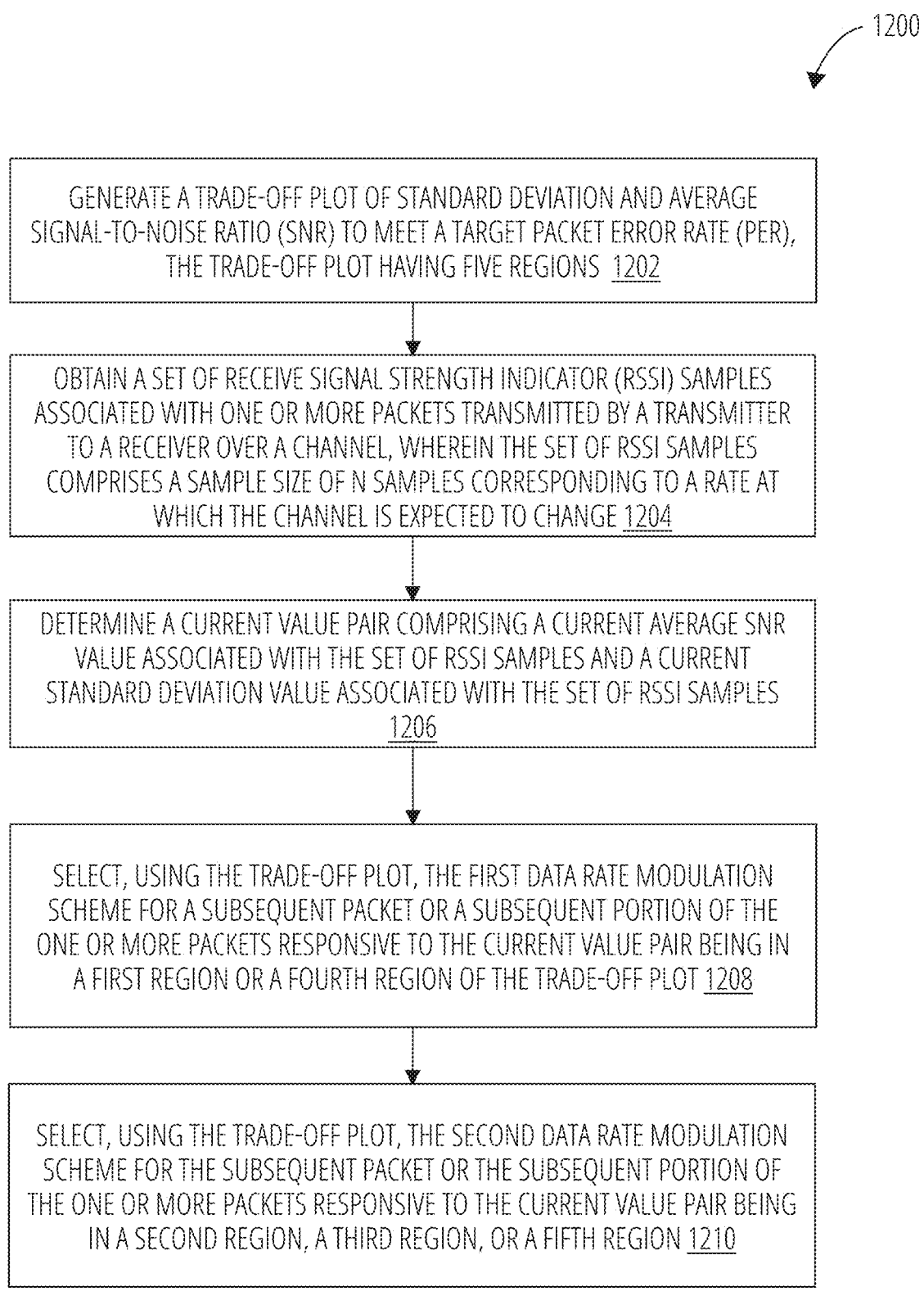
FIG. 12 is a flow diagram of a method of selecting different first data rate modulation schemes based on average SNR and standard deviation using a trade-off plot according to at least one embodiment.

FIG. 12 is a flow diagram of a method 1200 of selecting different first data rate modulation schemes based on average SNR and standard deviation using a trade-off plot according to at least one embodiment. The method 1200 can be performed by processing logic that comprises hardware (e.g., circuitry, dedicated logic, programmable logic, microcode, etc.), software, firmware, or a combination thereof. In one embodiment, the rate-adaptation logic 102 of FIG. 1 or FIG. 3 can perform the method 1200. In another embodiment, a wireless device 300 can perform method 1200. In another embodiment, a processing device can perform the method 1200.

Referring to FIG. 12, the method 1200 begins with the processing logic generating a trade-off plot of standard deviation and average SNR to meet a target PER (block 1202). The trade-off plot can include five regions corresponding to different channel fading conditions and is defined by a first slope, a second slope, and a standard deviation threshold. The first slope corresponds to a minimum SNR required with a first data rate modulation scheme at a given standard deviation to meet the target PER. The second slope corresponds to a minimum SNR required with a second data rate modulation scheme at a given standard deviation to meet the target PER. The second data rate modulation scheme has a higher data rate than the first data rate modulation scheme. The processing logic obtains a set of RSSI samples associated with one or more packets transmitted by a transmitter to a receiver over a channel (block 1204). The set of RSSI samples includes a sample size of N samples corresponding to a rate at which the channel is expected to change. The processing logic determines a current value pair comprising a current average SNR value associated with the set of RSSI samples and a current standard deviation value associated with the set of RSSI samples (block 1206). The processing logic selects, using the trade-off plot, the first data rate modulation scheme for a subsequent packet or a subsequent portion of the one or more packets responsive to the current value pair being in a first region or a fourth region of the trade-off plot (block 1208). The first region corresponds to value pairs that are less than the second slope and greater than the first slope, and the current standard deviation is less than or equal to the standard deviation threshold. The fourth region corresponds to value pairs less than the first slope, and the current standard deviation is less than the standard deviation threshold. Alternatively, the processing logic selects, using the trade-off plot, the second data rate modulation scheme for the subsequent packet or the subsequent portion of the one or more packets responsive to the current value pair being in a second region, a third region, or a fifth region (block 1210), and the method 1200 ends. The second region corresponds to value pairs that are less than the first slope and greater than the second slope, and the current standard deviation is greater than the standard deviation threshold. The third region corresponds to value pairs that are greater than the first slope and the second slope. The fifth region corresponds to value pairs less than the second slope, and the current standard deviation is greater than the standard deviation threshold.

In a further embodiment, after selecting the second data rate modulation scheme, the processing logic causes a current packet to be repeated after an amount of time equal to 2T, where T represents a coherence time where the channel is expected to remain with a 50 percent correlation. The coherence time is based on a velocity of a device comprising the transmitter.

In at least one embodiment, the processing logic performs method 1200 on a transmitter device. In another embodiment, the processing logic performs the method 1200 on a receiver device. When done on the receiver device, the receiver device can send indications/information/signals to the transmitter device to select the different data rate modulation schemes.

Figure 13:
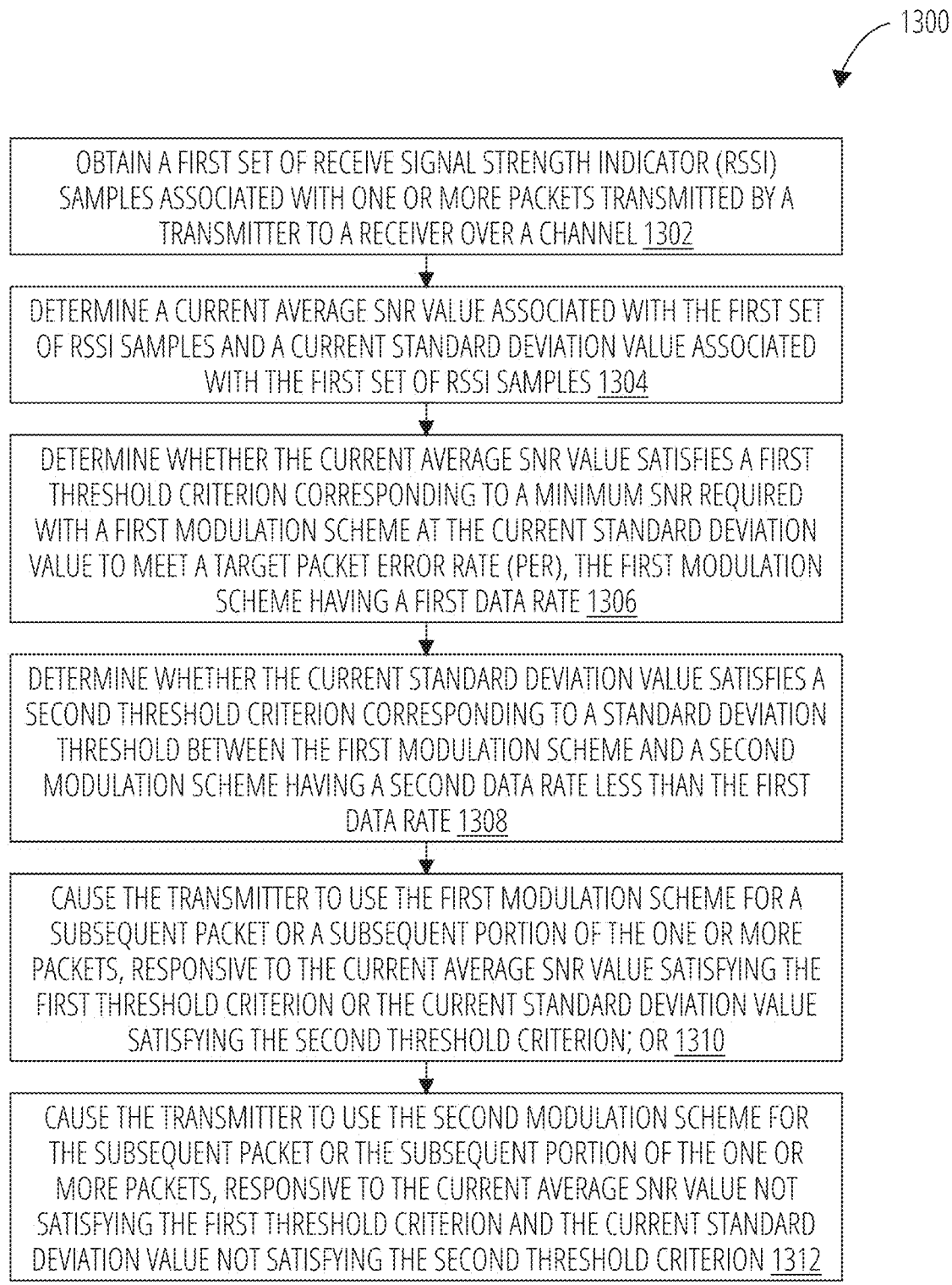
FIG. 13 is a flow diagram of a method of using different modulation schemes based on average SNR and standard deviation according to at least one embodiment.

FIG. 13 is a flow diagram of a method 1300 of using different modulation schemes based on average SNR and standard deviation according to at least one embodiment. The method 1300 can be performed by processing logic that comprises hardware (e.g., circuitry, dedicated logic, programmable logic, microcode, etc.), software, firmware, or a combination thereof. In one embodiment, the rate-adaptation logic 102 of FIG. 1 or FIG. 3 can perform the method 1300. In another embodiment, a wireless device 300 can perform method 1300. In another embodiment, a processing device can perform the method 1300.

Referring to FIG. 13, the method 1300 begins with the processing logic obtaining a first set of RSSI samples associated with one or more packets transmitted by a transmitter to a receiver over a channel (block 1302). In at least one embodiment, the set of RSSI samples has a sample size of N samples corresponding to a rate at which the channel is expected to change. The processing logic determines a current average SNR value associated with the first set of RSSI samples and a current standard deviation value associated with the first set of RSSI samples (block 1304). The processing logic determines whether the current average SNR value satisfies a first threshold criterion corresponding to a minimum SNR required with a first modulation scheme at the current standard deviation value to meet a target Packet Error Rate (PER) (block 1306). The first modulation scheme has a first data rate. The processing logic determines whether the current standard deviation value satisfies a second threshold criterion corresponding to a standard deviation threshold between the first modulation scheme and a second modulation scheme having a second data rate less than the first data rate (block 1308). The processing logic causes the transmitter to use the first modulation scheme for a subsequent packet or a subsequent portion of the one or more packets, responsive to the current average SNR value satisfying the first threshold criterion or the current standard deviation value satisfying the second threshold criterion (block 1310). The processing logic causes the transmitter to use the second modulation scheme for the subsequent packet or the subsequent portion of the one or more packets, responsive to the current average SNR value not satisfying the first threshold criterion and the current standard deviation value not satisfying the second threshold criterion (block 1312), and the method 1300 ends.

In a further embodiment, the processing logic can determine whether the current average SNR value satisfies the first threshold criterion and whether the current standard deviation value satisfies the second threshold criterion on a device that includes the receiver. The processing logic causes the transmitter to use the first modulation scheme by sending a first indicator to the transmitter from the receiver. The processing logic causes the transmitter to use the second modulation scheme by sending a second indicator to the transmitter from the receiver.

In a further embodiment, the processing logic can determine whether the current average SNR value satisfies the first threshold criterion and whether the current standard deviation value satisfies the second threshold criterion on a device that includes a processing device and the transmitter. The processing logic causes the transmitter to use the first modulation scheme by sending a first control signal from the processing device to the transmitter. The processing logic causes the transmitter to use the second modulation scheme by sending a second control signal from the processing device to the transmitter.

In a further embodiment, after causing the transmitter to use the first modulation scheme, the processing logic can cause a current packet to be repeated after an amount of time equal to 2T, where T represents a coherence time where the channel is expected to remain with a 50 percent correlation. The coherence time is based on a device's velocity, including the transmitter. In at least one embodiment, the processing logic can obtain location information over time from a GPS device and calculate the velocity based on the location information.

In a further embodiment, the processing logic can generate a data structure with five regions. The five regions can be defined by the standard deviation threshold, a first slope of standard deviations and average SNRs to meet the target PER using the second modulation scheme, and a second slope of standard deviations and average SNRs to meet the target PER using the first modulation scheme.

In a further embodiment, the processing logic can cause the transmitter to use the first modulation scheme by selecting, using the data structure and a current value pair, including the current average SNR value and the current standard deviation value, the first modulation scheme for the subsequent packet or the subsequent portion responsive to the current value pair being in a second region, a third region, or a fifth region. The second region corresponds to value pairs that are less than the first slope and greater than the second slope, and the current standard deviation is greater than the standard deviation threshold. The third region corresponds to value pairs that are greater than the first slope and the second slope. The fifth region corresponds to value pairs less than the second slope, and the current standard deviation is greater than the standard deviation threshold. The processing logic can cause the transmitter to use the second modulation scheme by selecting, using the data structure and the current value pair, the second modulation scheme for the subsequent packet or the subsequent portion responsive to the current value pair being in a first region or a fourth region of the data structure. The first region corresponds to value pairs that are less than the second slope and greater than the first slope, and the current standard deviation is less than or equal to the standard deviation threshold. The fourth region corresponds to value pairs less than the first slope, and the current standard deviation is less than the standard deviation threshold.

In at least one embodiment, the first slope corresponds to a minimum SNR required with the second modulation scheme at a given standard deviation to meet the target PER. When the current standard deviation value is equal to zero, the required SNR value is equal to a second sensitivity limit that can be achieved with the second modulation scheme. The second slope corresponds to a minimum SNR required with the first modulation scheme at a given standard deviation to meet the target PER. When the current standard deviation value is equal to zero, the required SNR value is equal to a first sensitivity limit that can be achieved with the first modulation scheme. The first sensitivity limit is greater than the second sensitivity limit.

In at least one embodiment, when the current value pair is in the first region, the second modulation scheme provides better performance than the first modulation scheme. In at least one embodiment, when the current value pair is in the second region, the first modulation scheme provides better performance than the second modulation scheme. In at least one embodiment, when the current value pair is in the third region, the first modulation scheme provides better performance than the second modulation scheme. In at least one embodiment, an intersection point of the first slope and the second slope is a point of operation where both the first modulation scheme and the second modulation scheme exhibit the same performance. In a further embodiment, the processing logic can determine a value by adding an instantaneous SNR value to a product of the current standard deviation value multiplied by three. The processing logic determines whether the value is in the fourth region or the fifth region. The processing logic selects the first modulation scheme for the subsequent packet or the subsequent portion responsive to the value being in the fifth region. The processing logic selects the second modulation scheme for the subsequent packet or the subsequent portion responsive to the value being in the fourth region.

In a further embodiment, the processing logic can obtain a second set of RSSI samples associated with one or more additional packets transmitted by the transmitter to the receiver over the channel. The processing logic can determine a moving average SNR value associated with the first set of RSSI samples and the second set of RSSI samples, and a moving standard deviation value associated with the first set of RSSI samples and the second set of RSSI samples. The processing logic can determine whether the moving average SNR value satisfies the first threshold criterion and the second threshold criterion. The processing logic causes the transmitter to use the first modulation scheme for an additional subsequent packet or a subsequent portion of the one or more additional packets, responsive to the moving average SNR value satisfying the first threshold criterion or the moving standard deviation value satisfying the second threshold criterion. The processing logic causes the transmitter to use the second modulation scheme for the additional subsequent packet or the subsequent portion of the one or more additional packets, responsive to the moving average SNR value not satisfying the first threshold criterion and the moving standard deviation value not satisfying the second threshold criterion.

In a further embodiment, the processing logic can set a receiver gain of the receiver to a maximum value. The processing logic can back off the receiver gain until a peak detector no longer detects a signal saturation responsive to the current average SNR value greater than a sensitivity threshold value plus a value derived from the current standard deviation value.

Figure 14:
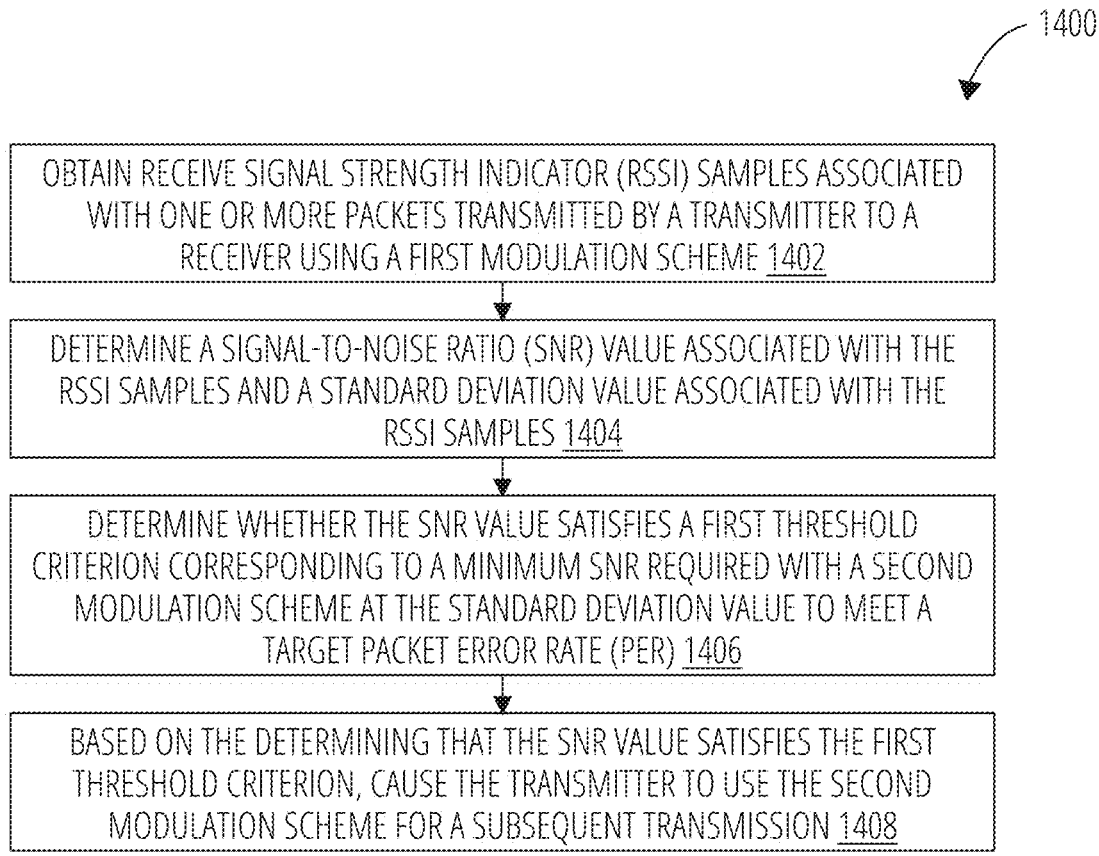
FIG. 14 is a flow diagram of a method of switching from a first modulation scheme to a second modulation scheme according to at least one embodiment.

FIG. 14 is a flow diagram of a method 1400 of switching from a first modulation scheme to a second modulation scheme according to at least one embodiment. The method 1400 can be performed by processing logic that comprises hardware (e.g., circuitry, dedicated logic, programmable logic, microcode, etc.), software, firmware, or a combination thereof. In one embodiment, the rate-adaptation logic 102 of FIG. 1 or FIG. 3 can perform the method 1400. In another embodiment, a wireless device 300 can perform method 1400. In another embodiment, a processing device can perform the method 1400.

Referring to FIG. 14, the method 1400 begins with the processing logic obtaining RSSI samples associated with one or more packets transmitted by a transmitter to a receiver using a first modulation scheme (block 1402). The processing logic determines a SNR value associated with the RSSI samples and a standard deviation value associated with the RSSI samples (block 1404). The processing logic determines whether the SNR value satisfies a first threshold criterion corresponding to a minimum SNR required with a second modulation scheme at the standard deviation value to meet a target PER (block 1406). Based on the determining that the SNR value satisfies the first threshold criterion, the processing logic causes the transmitter to use the second modulation scheme for a subsequent transmission (block 1408).

In a further embodiment, the processing logic is in a transmitting electronic device. The processing logic can determine a coherence time based on a velocity of the transmitting electronic device. The processing logic can repeat transmission of a packet to the electronic device after a first time determined based on the coherence time.

In a further embodiment, the first modulation scheme is associated with a first data rate, and the second modulation scheme is associated with a second data rate that is different than the first data rate.

Figure 15:
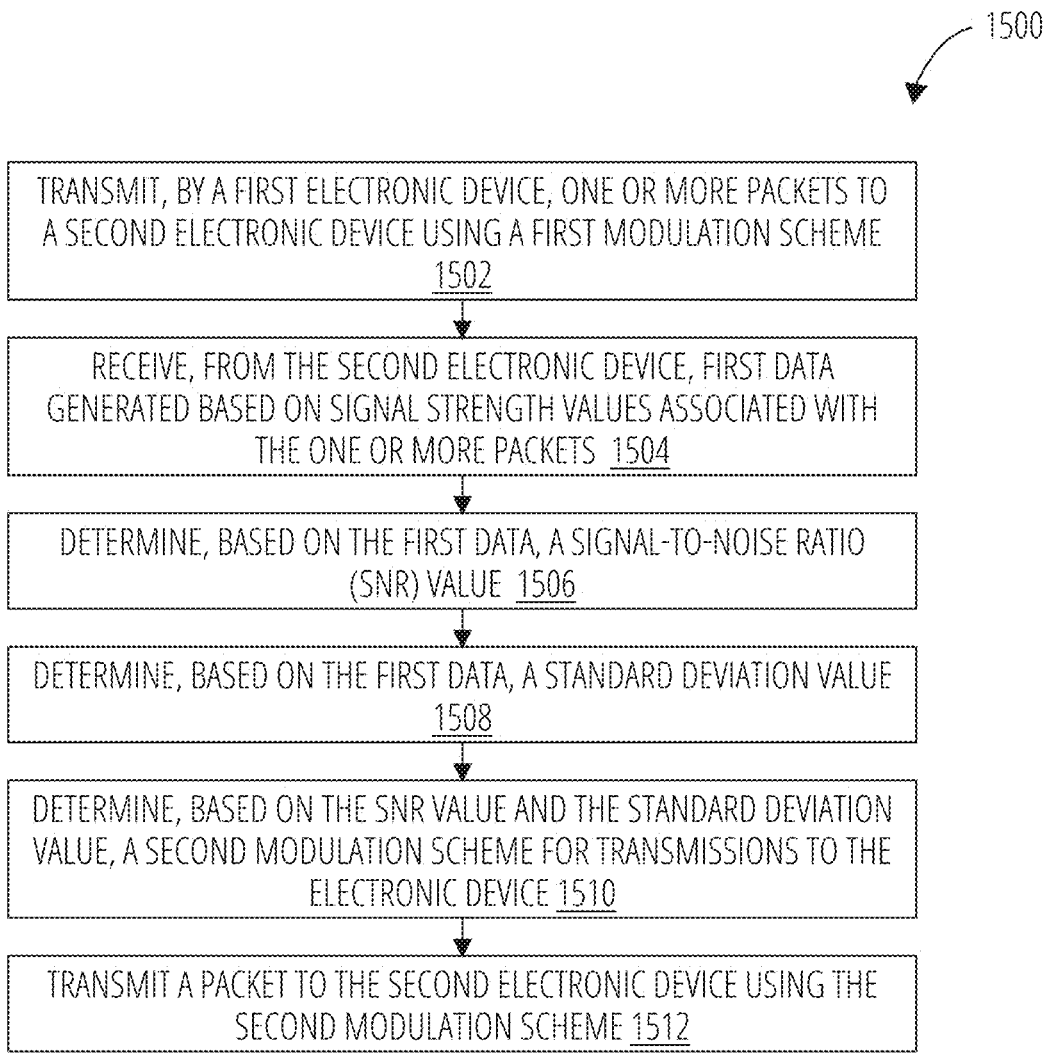
FIG. 15 is a flow diagram of a method of switching from a first modulation scheme to a second modulation scheme according to at least one embodiment.

FIG. 15 is a flow diagram of a method 1500 of switching from a first modulation scheme to a second modulation scheme according to at least one embodiment. The method 1500 can be performed by processing logic that comprises hardware (e.g., circuitry, dedicated logic, programmable logic, microcode, etc.), software, firmware, or a combination thereof. In one embodiment, the rate-adaptation logic 102 of FIG. 1 or FIG. 3 can perform the method 1500. In another embodiment, a wireless device 300 can perform method 1500. In another embodiment, a processing device can perform the method 1500.

Referring to FIG. 15, the method 1500 begins with the processing logic transmitting, by a first electronic device, one or more packets to a second electronic device using a first modulation scheme (block 1502). The processing logic receives, from the second electronic device, first data generated based on signal strength values associated with the one or more packets (block 1504). The processing logic determines, based on the first data, an SNR value (block 1506). The processing logic determines, based on the first data, a standard deviation value (block 1508). The processing logic determines, based on the SNR value and the standard deviation value, a second modulation scheme for transmissions to the electronic device (block 1510). The processing logic transmits a packet to the second electronic device using the second modulation scheme (block 1512).

In a further embodiment, the first modulation scheme is associated with a first data rate, and the second modulation scheme is associated with a second data rate that is different than the first data rate. In at least one embodiment, the first modulation scheme is a chirp spread spectrum modulation scheme and the second modulation scheme is one of a FSK modulation scheme, a GFSK modulation scheme, an OFDM scheme, an OFDMA scheme, or the like.

In a further embodiment, the processing logic determines a coherence time based on a change in position over time of the first electronic device. The processing logic determines that the coherence time has passed. Based on the determination that the coherence time has passed, the processing logic transmits at least a portion of a copy of the packet to the second electronic device using the second modulation scheme.

In a further embodiment, the processing logic receives second data from a navigation system. The processing logic determines a first location based on the second data. The processing logic receives third data from the navigation system. The processing logic determines a second location based on the second data. The processing logic determines the change in position over time based on the first location and the second location.

In another embodiment, prior to transmitting the packet using the second modulation scheme, the processing logic transmits, from the first electronic device to the second electronic device, second data comprising an indication of the second modulation scheme.

In another embodiment, the processing logic receives, from the electronic device, second data generated based on signal strength values associated with additional packets. The processing logic determines, based on the first data and the second data, a second average SNR value and a second standard deviation value. The processing logic determines, based on the second average SNR value and the second standard deviation value, whether to utilize the first modulation scheme or the second modulation scheme for transmissions to the electronic device.

In at least one embodiment, the signal strength values associated with the one or more packets comprise a sample size of N samples corresponding to a rate at which a channel is expected to change.

In a further embodiment, the processing logic sets a receiver gain of the receiver to a maximum value. The processing logic backs off the receiver gain until a peak detector is no longer detecting a signal saturation responsive to the average SNR value being greater than a sensitivity threshold value plus a value determined based on the standard deviation value.

In at least one embodiment, the processing logic determines whether the SNR value satisfies a first threshold corresponding to a minimum SNR required with the first modulation scheme at the standard deviation value to meet a target PER. In at least one embodiment, the processing logic is to determine to utilize the second modulation scheme based on a look-up table. In at least one embodiment, the first data includes a set of RSSI samples. In at least one embodiment, the first data includes an indication of the SNR value and the standard deviation value.

Figure 16:
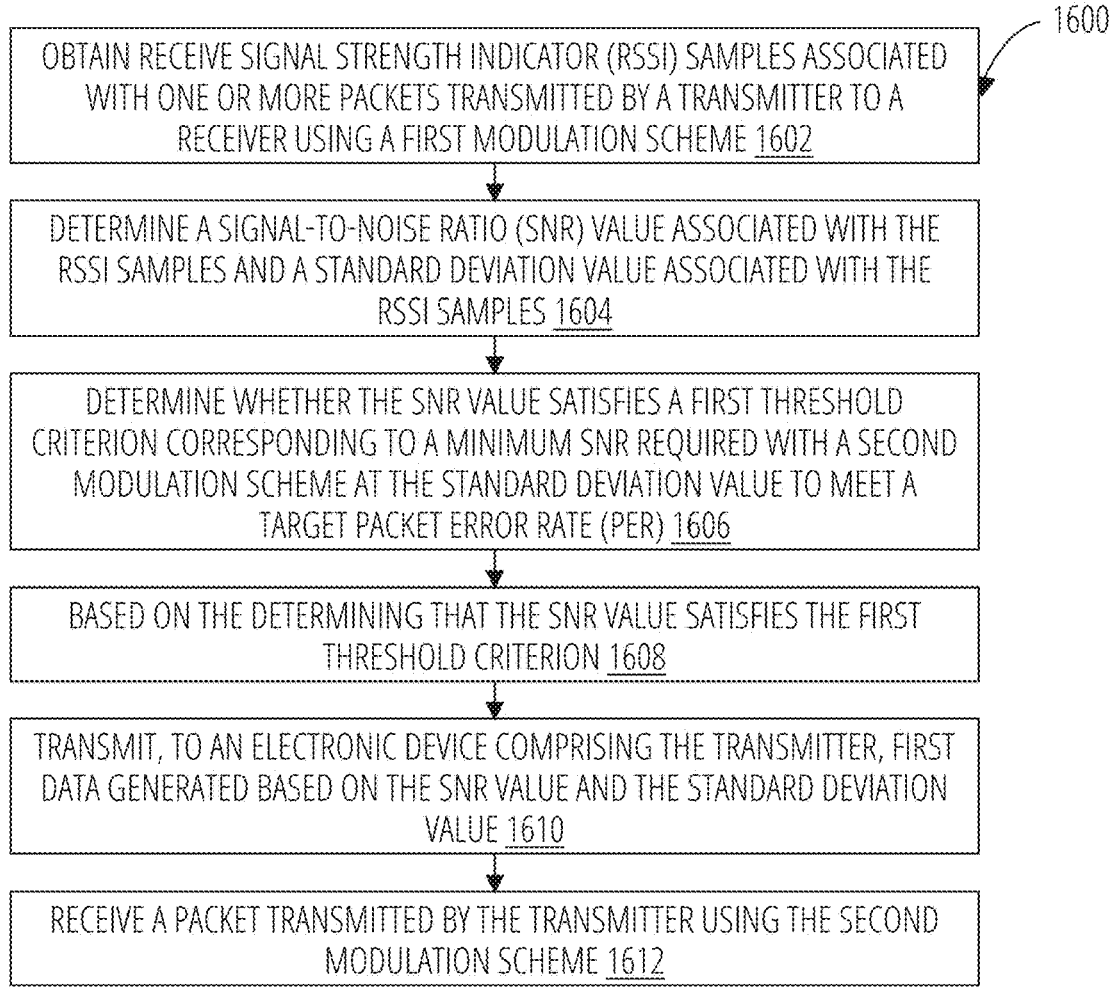
FIG. 16 is a flow diagram of a method of switching from a first modulation scheme to a second modulation scheme in a receiving device according to at least one embodiment.

FIG. 16 is a flow diagram of a method 1600 of switching from a first modulation scheme to a second modulation scheme in a receiving device according to at least one embodiment. The method 1600 can be performed by processing logic that comprises hardware (e.g., circuitry, dedicated logic, programmable logic, microcode, etc.), software, firmware, or a combination thereof. In one embodiment, the rate-adaptation logic 102 of FIG. 1 or FIG. 3 can perform the method 1600. In another embodiment, a wireless device 300 can perform method 1600. In another embodiment, a processing device can perform the method 1600.

Referring to FIG. 16, the method 1600 begins with the processing logic obtaining RSSI samples associated with one or more packets transmitted by a transmitter to a receiver using a first modulation scheme (block 1602). The processing logic determines an SNR value associated with the RSSI samples and a standard deviation value associated with the RSSI samples (block 1604). The processing logic determines whether the SNR value satisfies a first threshold criterion corresponding to a minimum SNR required with a second modulation scheme at the standard deviation value to meet a target PER (block 1606). Based on the determination that the SNR value satisfies the first threshold criterion, the processing logic transmits, to an electronic device including the transmitter, first data generated based on the SNR value and the standard deviation value (block 1608). The processing logic receives a packet transmitted by the transmitter using the second modulation scheme (block 1610).

In a further embodiment, the method 1600 is performed by the receiving device and further includes determining a coherence time based on a velocity of the electronic device. The processing logic sends second data to the electronic device, the second data causing the electronic device to repeat transmission of a packet after a first time determined based on the coherence time.

In a further embodiment, the first modulation scheme is associated with a first data rate, and the second modulation scheme is associated with a second data rate that is different than the first data rate.

Figure 17:
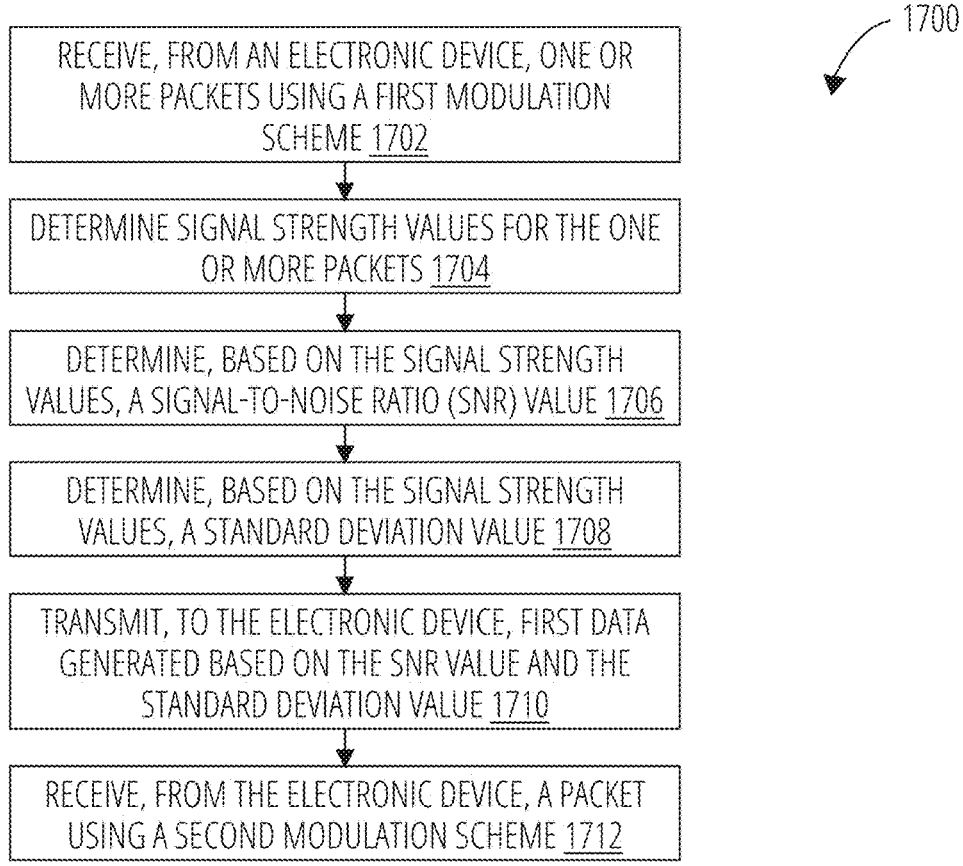
FIG. 17 is a flow diagram of a method of switching from a first modulation scheme to a second modulation scheme in a receiving device according to at least one embodiment.

FIG. 17 is a flow diagram of a method 1700 of switching from a first modulation scheme to a second modulation scheme in a receiving device according to at least one embodiment. The method 1700 can be performed by processing logic that comprises hardware (e.g., circuitry, dedicated logic, programmable logic, microcode, etc.), software, firmware, or a combination thereof. In one embodiment, the rate-adaptation logic 102 of FIG. 1 or FIG. 3 can perform the method 1700. In another embodiment, a wireless device 300 can perform method 1700. In another embodiment, a processing device can perform the method 1500.

Referring to FIG. 17, the method 1700 begins with the processing logic receiving, from an electronic device, one or more packets using a first modulation scheme (block 1702). The processing logic determines signal strength values for the one or more packets (block 1704). The processing logic determines, based on the signal strength values, an SNR value (block 1706). The processing logic determines, based on the signal strength values, a standard deviation value (block 1708). The processing logic transmits, to the electronic device, first data generated based on the SNR value and the standard deviation value (block 1710). The processing logic receives, from the electronic device, a packet using a second modulation scheme (block 1712).

In a further embodiment, the first data comprises an indication of the SNR value and an indication of the standard deviation value.

In a further embodiment, the processing logic determines, based on the SNR value and the standard deviation value, to utilize the second modulation scheme. In at least one embodiment, the first data includes an indication to use the second modulation scheme.

In a further embodiment, the processing logic demodulates the one or more packets using a first demodulation scheme associated with the first modulation scheme. The processing logic demodulates the packet using a second demodulation scheme associated with the second modulation scheme.

In a further embodiment, the first modulation scheme is a chirp spread spectrum modulation scheme and the second modulation scheme is one of a FSK modulation scheme, a GFSK modulation scheme, an OFDM scheme, an OFDMA scheme, or the like.

In a further embodiment, the processing logic determines a coherence time based on a change in position over time of the electronic device. The processing logic sends second data to the electronic device, the second data causing the electronic device to repeat transmission of the packet after a first time determined based on the coherence time. The processing logic receives the repeated transmission of the packet.

In a further embodiment, the processing logic receives, from the electronic device, one or more additional packets. The processing logic determines additional signal strength values for the one or more additional packets. The processing logic determines, based on the signal strength values and the additional signal strength values, a second SNR value. The processing logic determines, based on the signal strength values and the additional signal strength values, a second standard deviation value. The processing logic transmits, to the electronic device, second data generated based on the second SNR value and the second standard deviation value. The processing logic receives, from the electronic device, an additional packet using either the first modulation scheme or the second modulation scheme.

In at least one embodiment, the signal strength values associated with the one or more packets includes a sample size of N samples corresponding to a rate at which a channel is expected to change.

In a further embodiment, the processing logic sets a receiver gain of a receiver to a maximum value. The processing logic backs off the receiver gain until a peak detector is no longer detecting a signal saturation responsive to the SNR value being greater than a sensitivity threshold value plus a value determined based on the standard deviation value.

Figure 18:
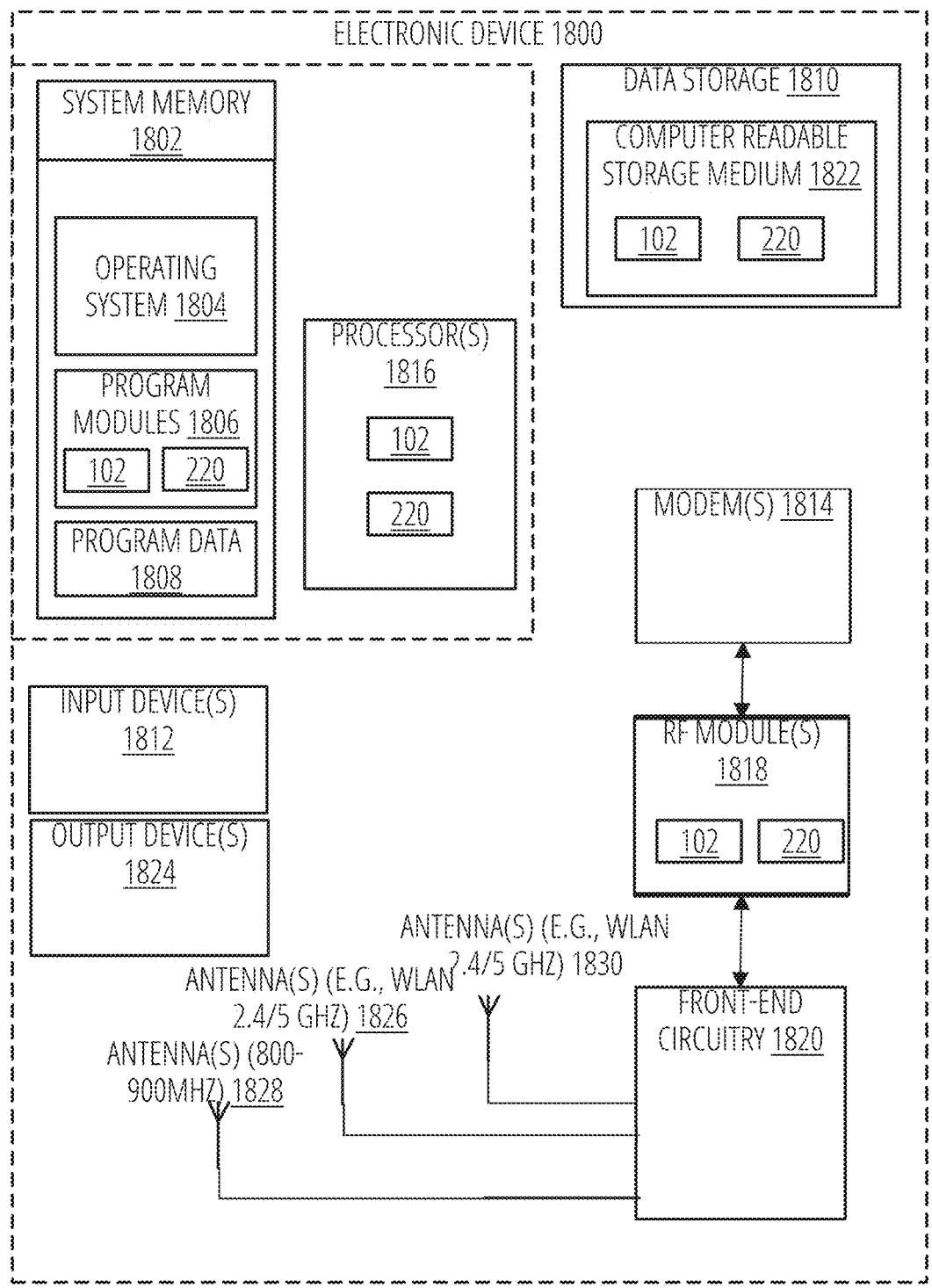
FIG. 18 is a block diagram of an electronic device with rate-adaptation logic and receiver-gain control logic for mitigating shadow fading and interference according to one embodiment.

FIG. 18 is a block diagram of an electronic device 1400 with rate-adaptation logic 102 and receiver-gain control logic 220 for mitigating shadow fading and interference according to one embodiment. The rate-adaptation logic 102 and receiver-gain control logic 220 can be software executed by the electronic device 1400 to perform the operations described herein. The rate-adaptation logic 102 and receiver-gain control logic 220 can be firmware or hardware of the electronic device 1400 to perform the operations described herein. The electronic device 1400 may correspond to any of the nodes or devices described above with respect to FIG. 1 to FIG. 15. Alternatively, the electronic device 1400 may be other electronic devices, as described herein.

The electronic device 1800 includes one or more processor(s) 1816, such as one or more central processing units (CPUs), microcontrollers, field-programmable gate arrays, or other types of processing devices. The electronic device 1800 also includes system memory 1802, which may correspond to any combination of volatile and/or non-volatile storage mechanisms (e.g., one or more memory devices). The system memory 1802 stores information that provides an operating system 1804, various program modules 1806, program data 1808, and/or other components. In one embodiment, the system memory 1802 stores instructions of methods to control the operation of the electronic device 1800. The electronic device 1800 performs functions using the processor(s) 1816 to execute instructions provided by the system memory 1802. In one embodiment, the program modules 1806 may include the rate-adaptation logic 102 and receiver-gain control logic 220 described herein.

In at least one embodiment, a processing device is operatively coupled to a memory device that stores instructions. The processing device executes instructions to perform various operations of the rate-adaptation logic 102 and receiver-gain control logic 220 described herein.

The electronic device 1800 also includes a data storage device 1810 that may be composed of one or more types of removable storage and/or one or more types of non-removable storage. The data storage device 1810 includes a computer-readable storage medium 1822 on which is stored one or more sets of instructions embodying any of the methodologies or functions described herein. Instructions for the program modules 1806 (e.g., rate-adaptation logic 102 and receiver-gain control logic 220) may reside, completely or at least partially, within the computer-readable storage medium 1822, system memory 1802, and/or within the processor(s) 1816 during execution thereof by the electronic device 1800, the system memory 1802 and the processor(s) 1816 also constituting computer-readable media. The electronic device 1800 may also include one or more input devices 1812 (keyboard, mouse device, specialized selection keys, etc.) and one or more output devices 1824 (displays, printers, audio output mechanisms, etc.).

The electronic device 1800 further includes a modem 1814 to allow the electronic device 1800 to communicate via wireless connections (e.g., provided by the wireless communication system) with other computing devices, such as remote computers, an item-providing system, and so forth. The modem 1814 can be connected to one or more radio frequency (RF) modules 1818. The RF modules 1818 may be a wireless local area network (WLAN) module, a Wide Area Network (WAN) module, a PAN module, Global Positioning System (GPS) module, or the like. The antenna structures (antenna(s) 1826, 1828, 1830) are coupled to the RF circuitry 1820, which is coupled to the modem 1814. The RF circuitry 1820 may include radio front-end circuitry, antenna-switching circuitry, impedance matching circuitry, or the like. The antennas 1826, 1828, 1830 may be GPS antennas, Near Field Communications (NFC) antennas, other WAN antennas, WLAN or PAN antennas, or the like. The modem 1814 allows the electronic device 1800 to handle both voice and non-voice communications (such as communications for text messages, multi-media messages, media downloads, web browsing, etc.) with a wireless communication system. The modem 1814 may provide network connectivity using any type of mobile network technology, including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem 1814 may generate signals and send these signals to the antenna(s) 1826 of a first type (e.g., WLAN 2.4/5 GHZ), antenna(s) 1828 of a second type (e.g., PAN), and/or antenna(s) 1830 of a third type (e.g., WLAN 2.4/5 GHZ), via RF circuitry 1820, and Rf module(s) 1818 as described herein. Antennas 1826, 1828, 1830 may be configured to transmit in different frequency bands and/or using different wireless communication protocols. The antennas 1826, 1828, 1830, may be directional, omnidirectional, or non-directional antennas. In addition to sending data, antennas 1826, 1828, 1830 may also receive data, which is sent to appropriate RF modules connected to the antennas. One of the antennas 1826, 1828, 1830 may be any combination of the antenna structures described herein.

In one embodiment, the electronic device 1800 establishes a first connection using a first wireless communication protocol, and a second connection using a different wireless communication protocol. The first wireless connection and second wireless connection may be active concurrently; for example, if a network hardware device is receiving a media item from another network hardware device via the first connection and transferring a file to another user device via the second connection at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of a wireless mesh network (WMN), and the second wireless connection may be associated with serving a content file to a client consumption device, as described herein.

Though a modem 1814 is shown to control transmission and reception via the antenna (1826, 1828, 1830), the electronic device 1800 may alternatively include multiple modems, each of which is configured to transmit/receive data via a different antenna and/or wireless transmission protocol.

In other embodiment, one or more hardware network devices can be mesh network devices in a WMN. A WMN can contain multiple mesh network devices, organized in a mesh topology. The mesh network devices in the WMN cooperate in the distribution of content files to client consumption devices in an environment, such as an environment of limited connectivity to broadband Internet infrastructure. The embodiments described herein may be implemented where there is a lack, or slow rollout, of suitable broadband Internet infrastructure in developing nations, for example. These mesh networks can be used in the interim before broadband Internet infrastructure becomes widely available in those developing nations. The network hardware devices are also referred to as mesh routers, mesh network devices, mesh nodes, Meshboxes, or Meshbox nodes. Multiple network hardware devices are wirelessly connected through a network backbone formed by multiple peer-to-peer (P2P) wireless connections (i.e., wireless connections between multiple pairs of network hardware devices). The multiple network devices are wirelessly connected to one or more client consumption devices by node-to-client (N2C) wireless connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, tracking tags, IoT devices, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some embodiments described herein, the mesh network architecture does not include "gateway" nodes capable of forwarding broadband mesh traffic to the Internet. The mesh network architecture may include a limited number of point-of-presence (POP) nodes that do have access to the Internet, but the majority of mesh network devices are capable of forwarding broadband mesh traffic between the mesh network devices for delivering content to client consumption devices that would otherwise not have broadband connections to the Internet. Alternatively, instead of the POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN) but in a localized manner. The WMN can be deployed in a geographical area in which broadband Internet is limited. The WMN can scale to support a geographic area based on the number of mesh network devices and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical, or access patterns are predictable. The embodiments described herein are compatible with existing content delivery technologies and may leverage architectural solutions, such as CDN services like the Amazon AWS CloudFront service. Amazon CloudFront CDN is a global CDN service that integrates with other Amazon Web services products to distribute content to end-users with low latency and high data transfer speeds. The embodiments described herein can be an extension to this global CDN, but in environments with limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g., streaming video) that are increasingly becoming a significant percentage of broadband traffic and taxing existing infrastructure in a way that is not sustainable.

In the above description, numerous details are set forth. It will be apparent, however, to one of ordinary skill in the art having the benefit of this disclosure that embodiments may be practiced without these specific details. In some instances, well-known structures and devices are shown in block diagram form rather than in detail to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
    obtaining Receive Signal Strength Indicator (RSSI) samples associated with one or more packets transmitted by a transmitter to a receiver using a first modulation scheme;
    determining a signal-to-noise ratio (SNR) value associated with the RSSI samples and a standard deviation value associated with the RSSI samples;
    determining whether the SNR value satisfies a first threshold criterion corresponding to a minimum SNR required with a second modulation scheme at the standard deviation value to meet a target Packet Error Rate (PER); and
    based on the determining that the SNR value satisfies the first threshold criterion, causing the transmitter to use the second modulation scheme for a subsequent transmission.

2. The method of claim 1, wherein the method is performed by a transmitting electronic device, and wherein the method further comprises determining a coherence time based on a velocity of the transmitting electronic device; and repeating transmission of a packet to a receiving electronic device after a first time determined based on the coherence time.

3. The method of claim 1, wherein the first modulation scheme is associated with a first data rate, and the second modulation scheme is associated with a second data rate that is different than the first data rate.

4. A method comprising:
transmitting, by a first electronic device, one or more packets to a second electronic device using a first modulation scheme;
receiving, from the second electronic device, first data generated based on signal strength values associated with the one or more packets;
determining, based on the first data, a signal-to-noise ratio (SNR) value,
determining, based on the first data, a standard deviation value;
determining, based on the SNR value and the standard deviation value, a second modulation scheme for transmissions to the second electronic device; and
transmitting a packet to the second electronic device using the second modulation scheme.

5. The method of claim 4, wherein the first modulation scheme is associated with a first data rate, and the second modulation scheme is associated with a second data rate that is different than the first data rate.

6. The method of claim 4, wherein the first modulation scheme is a chirp spread spectrum modulation scheme and the second modulation scheme is one of a frequency shift keying (FSK) modulation scheme, a Gaussian FSK modulation scheme, an Orthogonal Frequency-Division Multiplexing (OFDM) scheme, or an Orthogonal Frequency-Division Multiple Access (OFDMA) scheme.

7. The method of claim 4, wherein the method further comprises
determining a coherence time based on a change in position over time of the first electronic device;
determining that the coherence time has passed; and
based on the determining that the coherence time has passed, transmitting at least a portion of a copy of the packet to the second electronic device using the second modulation scheme.

8. The method of claim 7, further comprising:
receiving second data from a navigation system;
determining a first location based on the second data;
receiving third data from the navigation system;
determining a second location based on the second data; and
determining the change in position over time based on the first location and the second location.

9. The method of claim 4, wherein the method further comprises, prior to transmitting the packet using the second modulation scheme:
transmitting, from the first electronic device to the second electronic device, second data comprising an indication of the second modulation scheme.

10. The method of claim 4, further comprising:
receiving, from the second electronic device, second data generated based on signal strength values associated with additional packets;
determining, based on the first data and the second data, a second SNR value and a second standard deviation value; and determining, based on the second SNR value and the second standard deviation value, whether to utilize the first modulation scheme or the second modulation scheme for transmissions to the second electronic device.

11. The method of claim 4, wherein the signal strength values associated with the one or more packets comprise a sample size of N samples corresponding to a rate at which a channel is expected to change.

12. The method of claim 4, further comprising:
setting a receiver gain of a receiver to a maximum value; and
backing off the receiver gain until a peak detector is no longer detecting a signal saturation responsive to the SNR value being greater than a sensitivity threshold value plus a value determined based on the standard deviation value.

13. A wireless device comprising:
a wireless radio; and
a processing device coupled to the wireless radio; and
a memory storing instructions that, when executed by the processing device, configure the wireless device to:
transmit symbols to an electronic device using a first modulation scheme;
receive, from the electronic device, first data generated based on signal strength values associated with the symbols;
determine, based on the first data, a signal-to-noise ratio (SNR) value;
determine, based on the first data, a standard deviation value;
determine, based on the SNR value and the standard deviation value, to utilize a second modulation scheme for transmissions to the electronic device; and
transmit a packet to the electronic device using the second modulation scheme.

14. The wireless device of claim 13, wherein the memory stores instructions that, when executed by the processing device, configure the wireless device to:
determine a coherence time based on a change in position of the wireless device over time;
determine that the coherence time has passed; and
based on the determining that the coherence time has passed, transmit at least a portion of a copy of the packet to the electronic device using the second modulation scheme.

15. The wireless device of claim 14, wherein the memory stores instructions that, when executed by the processing device, configure the wireless device to:
receive second data from a navigation system;
determine a first location based on the second data;
receive third data from the navigation system;
determine a second location based on the second data; and
determine a velocity based on the first location and the second location.

16. The wireless device of claim 13, wherein the first modulation scheme is associated with a lower data rate than the second modulation scheme.

17. The wireless device of claim 13, wherein the memory stores instructions that, when executed by the processing device, configure the wireless device to:
receive, from the electronic device, second data generated based on signal strength values associated with additional symbols;
determine, based on the SNR value and the second data, a moving average SNR value;

determine, based on the standard deviation value and the second data, a moving standard deviation value; and determine, based on the moving average SNR value and the moving standard deviation value, whether to utilize the first modulation scheme or the second modulation scheme for transmissions to the electronic device.

18. The wireless device of claim 13, wherein the memory stores instructions that, when executed by the processing device, configure the wireless device to:

determine whether the SNR value satisfies a first threshold corresponding to a minimum SNR required with the first modulation scheme at the standard deviation value to meet a target Packet Error Rate (PER).

19. The wireless device of claim 13, wherein the processing device is to determine to utilize the second modulation scheme based on a look-up table.

20. The wireless device of claim 13, wherein the first data comprises a set of Receive Signal Strength Indicator (RSSI) samples.

21. The wireless device of claim 13, wherein the first data comprises an indication of the SNR value and the standard deviation value.

22. The wireless device of claim 13, wherein the memory stores instructions that, when executed by the processing device, configure the wireless device to:

set a receiver gain of a receiver to a maximum value; and back off the receiver gain until a peak detector is no longer detecting a signal saturation responsive to the SNR value being greater than a sensitivity threshold value plus a value determined based on the standard deviation value.

* * * * *